US012803172B2

(12) United States Patent
Ikeda et al.

(10) Patent No.: US 12,803,172 B2
(45) Date of Patent: Nov. 17, 2026

(54) WAVEGUIDE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Masakazu Ikeda, Nisshin (JP); Hirokazu Oyabu, Nisshin (JP); Tetsuya Katayama, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 78 days.

(21) Appl. No.: 18/940,421

(22) Filed: Nov. 7, 2024

(65) Prior Publication Data

US 2025/0183542 A1 Jun. 5, 2025

(30) Foreign Application Priority Data

Dec. 1, 2023 (JP) ................................ 2023-203809

(51) Int. Cl.
*H01Q 13/06* (2006.01)
*H01P 1/04* (2006.01)
(Continued)

(52) U.S. Cl.
CPC ........... *H01Q 13/065* (2013.01); *H01P 1/042* (2013.01); *H01P 3/123* (2013.01); *H01Q 1/2283* (2013.01)

(58) Field of Classification Search
CPC .... H01Q 1/2283; H01Q 13/065; H01P 1/042; H01P 3/123
See application file for complete search history.

(56) References Cited

U.S. PATENT DOCUMENTS 5,955,752 A 9/1999 Fukaya et al.
9,583,811 B2 2/2017 Seler et al.
(Continued)

FOREIGN PATENT DOCUMENTS

JP 2007-336299 A 12/2007

OTHER PUBLICATIONS

Qiannan Ren et al., “Gapwaveguide Automotive Imaging Radar Antenna With Launcher in Package Technology”, IEEE Access, Apr. 13, 2023, pp. 37483-37493, vol. 11.
(Continued)

*Primary Examiner* — Amal Patel
(74) *Attorney, Agent, or Firm* — Posz Law Group, PLC

(57) ABSTRACT

A waveguide includes a first waveguide section and a second waveguide section disposed with a predetermined gap therebetween. The first waveguide section has first waveguide holes. The second waveguide section has second waveguide holes that open to face the first waveguide holes, respectively. Each of the second waveguide holes has an opening portion of an elongated hole shape that opens on a facing surface of the second waveguide section that faces the first waveguide section. A direction along a major axis of the opening portion of each of the second waveguide holes is defined as a major axis direction. The major axis direction of the opening portion of one of the second waveguide holes intersects with the major axis direction of the opening portion of another of the second waveguide holes that is adjacent to the one of the second waveguide holes.

4 Claims, 27 Drawing Sheets

(51) Int. Cl.
*H01P 3/123* (2006.01)
*H01Q 1/22* (2006.01)

(56) References Cited

U.S. PATENT DOCUMENTS

| | | | | |
|---|---|---|---|---|
| 2008/0129409 | A1 | 6/2008 | Nagaishi et al. | |
| 2009/0206961 | A1* | 8/2009 | Fujita | H01P 1/042 333/254 |
| 2009/0309680 | A1 | 12/2009 | Suzuki | |
| 2010/0231332 | A1 | 9/2010 | Sugimoto et al. | |
| 2011/0241805 | A1 | 10/2011 | Suzuki | |
| 2019/0027837 | A1 | 1/2019 | Kirino et al. | |
| 2019/0081412 | A1 | 3/2019 | Hügel et al. | |
| 2021/0376439 | A1 | 12/2021 | Karlsson et al. | |
| 2024/0154300 | A1* | 5/2024 | Thippur Shivamurthy | H01Q 1/38 |

OTHER PUBLICATIONS

U.S. Appl. No. 18/792,702, filed Aug. 2, 2024, Isono et al.
U.S. Appl. No. 18/792,774, filed Aug. 2, 2024, Ikeda et al.

* cited by examiner

WAVEGUIDE

CROSS REFERENCE TO RELATED APPLICATION

The present application claims the benefit of priority from Japanese Patent Application No. 2023-203809 filed on Dec. 1, 2023. The entire disclosure of the above application is incorporated herein by reference.

TECHNICAL FIELD

The present disclosure relates to a waveguide.

BACKGROUND

Conventionally, there has been known a waveguide mounted to a package that includes launchers for transmitting and receiving electromagnetic waves. The waveguide has waveguide holes for propagating the electromagnetic waves transmitted and received by the launchers.

SUMMARY

The present disclosure provides a waveguide including a first waveguide section and a second waveguide section disposed with a predetermined gap therebetween. The first waveguide section has first waveguide holes. The second waveguide section has second waveguide holes that open to face the first waveguide holes, respectively. Each of the second waveguide holes has an opening portion of an elongated hole shape that opens on a facing surface of the second waveguide section that faces the first waveguide section. A direction along a major axis of the opening portion of each of the second waveguide holes is defined as a major axis direction. The major axis direction of the opening portion of one of the second waveguide holes intersects with the major axis direction of the opening portion of another of the second waveguide holes that is adjacent to the one of the second waveguide holes.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
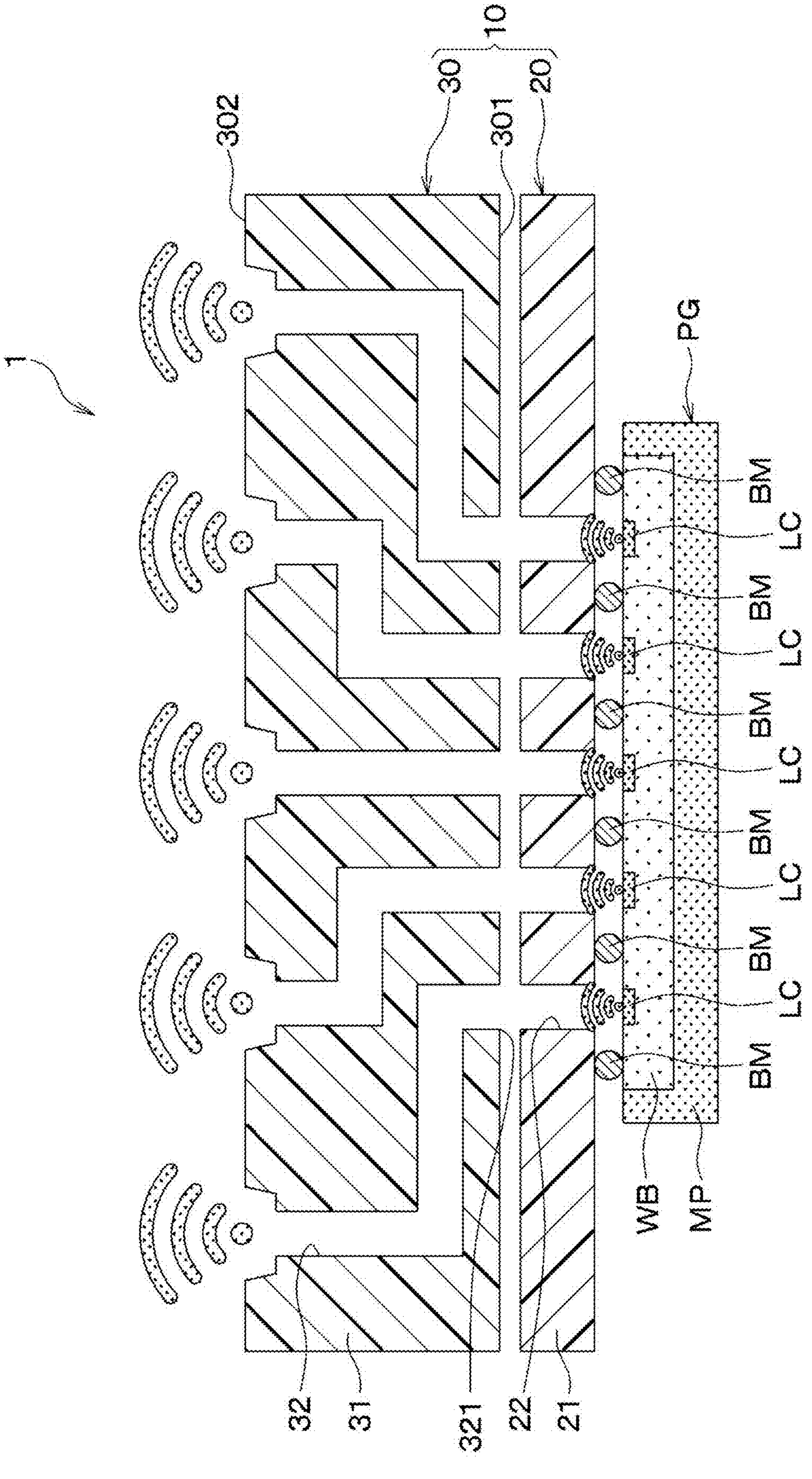
FIG. 1 is a schematic diagram of a radar device including a waveguide according to an embodiment.

The present inventors have studied a waveguide having a first waveguide section in which first waveguide holes are provided for propagating electromagnetic waves transmitted and received by launchers, and a second waveguide section in which second waveguide holes, the number of which is equal to the number of the first waveguide holes, are provided to face the first waveguide holes, respectively.

In this type of waveguide, if there is a gap between the first waveguide section and the second waveguide section, electromagnetic fields may leak from the gap, resulting in a deterioration in isolation. In the present disclosure, the term "isolation" means electromagnetic isolation. In response to this issue, for example, the isolation may be ensured by ensuring a large interval between adjacent opening portions of second waveguide holes. However, widening the interval between the opening portions of the waveguide holes leads to an increase in an arrangement interval between the launchers, which inevitably results in an increase a size of a package.

The present inventors have conducted diligent studies on waveguides. As results of the diligent studies, the inventors found that when adjacent opening portions of second waveguide holes having elongated hole shapes are arranged so that their major axis directions intersect with each other, directions of electric fields leaking from the adjacent opening portions intersect with each other, and the isolation can be ensured without widening the interval between adjacent opening portions.

A waveguide according to one aspect of the present disclosure has been devised based on the above findings. The waveguide according to the one aspect of the present disclosure is a waveguide to be applied to a package that includes launchers for transmitting and receiving electromagnetic waves, and includes a first wave section having first waveguide holes that are configured to propagate the electromagnetic waves transmitted and received by the launchers, and a second waveguide section having second waveguide holes that open to face the first waveguide holes, respectively. A number of the second waveguide holes is equal to a number of the first waveguide holes. The second waveguide section is disposed with a predetermined gap between the second waveguide section and the first waveguide section. Each of the second waveguide holes has an opening portion of an elongated hole shape that opens on a facing surface of the second waveguide section that faces the first waveguide section. A direction along a major axis of the opening portion of each of the second waveguide holes is defined as a major axis direction. The major axis direction of the opening portion of one of the second waveguide holes intersects with the major axis direction of the opening portion of another of the second waveguide holes that is adjacent to the one of the second waveguide holes.

The above-described configuration can ensure isolation without increasing an interval between the adjacent opening portions of the second waveguide holes. Therefore, by bringing the adjacent opening portions of the second waveguide holes closer to each other and reducing an arrangement interval between the launchers, it is possible to ensure the isolation while restricting the package from becoming larger.

Here, the term "elongated hole shape" refers to an ellipse or a shape similar to an ellipse, such as a rectangle with rounded corners, a chicken egg shape, an oval shape, a rectangle with chamfered corners, and the like.

An embodiment of the present disclosure will be described with reference to FIGS. 1 to 23.

In the present embodiment, an example in which a waveguide 10 according to the present disclosure is applied to a radar device 1 for detecting an object around a vehicle will be described.

The radar device 1, for example, emits electromagnetic waves toward the front of the vehicle and receives electromagnetic waves reflected by an object in front of the vehicle to determine a distance to the object, a relative speed of the object with respect to the vehicle, a direction of the object with respect to the vehicle, and the like. The radar device 1 employs a frequency modulated continuous wave (FMCW) method as a signal modulation method. The radar device 1 operates using radio waves in a frequency band corresponding to millimeter waves (for example, 76.5 GHz).

As shown in FIG. 1, the radar device 1 includes a package PG including launchers LC configured to transmit and receive electromagnetic waves, and a waveguide 10 mounted to the package PG. The package PG and the waveguide 10 are connected via a bonding member BM such as solder. The structure of the radar device 1 of the present embodiment in which the waveguide 10 is directly connected without through a printed circuit board or the like reduces wiring loss, making it possible to realize long-distance detection.

A configuration in which the waveguide 10 is mounted to the package PG, as in the present embodiment, is called an antenna on package (AOP) or an antenna in package (AIP). Since such a configuration enables the radar device 1 to be simplified and miniaturized, it is considered suitable for multi input multi output (MIMO) technology, which is a wireless communication method that requires a lot of antennas.

The package PG is composed of a semiconductor module such as a launcher in package (LIP) (for example, radio frequency integrated circuit (RFIC)). Specifically, the package PG includes a wiring board WB on which an antenna portion including the launchers LC is mounted, and a mold portion MP that seals the wiring board WB so that the antenna portion is exposed to the outside.

Figure 2:
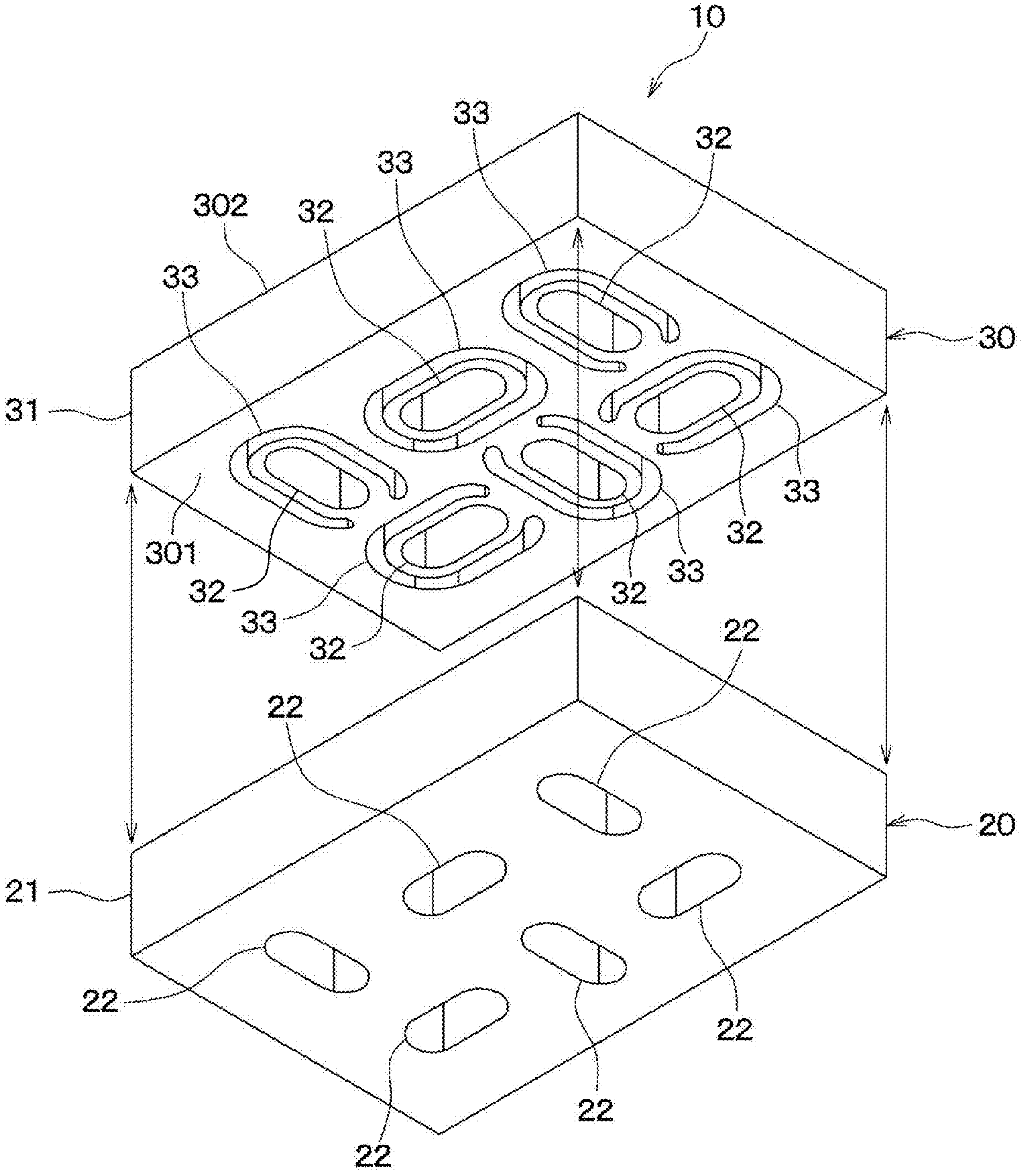
FIG. 2 is a schematic perspective view of the waveguide according to the embodiment.

Among propagation means for propagating electromagnetic waves, the waveguide 10 is considered to be suitable for propagating high frequency electromagnetic fields because the waveguide 10 has a small propagation loss of electromagnetic waves. As shown in FIG. 2, the waveguide 10 includes a first waveguide section 20 and a second waveguide section 30. The waveguide 10 is assembled in a state where the first waveguide section 20 and the second waveguide section 30 has a predetermined gap therebetween. In FIG. 2, the gap between the first waveguide section 20 and the second waveguide section 30 is shown large so that facing surfaces of the first waveguide section 20 and the second waveguide section 30 can be seen. In the following description, the gap between the first waveguide section 20 and the second waveguide section 30 is also referred to as a "guide section gap dg".

The first waveguide section 20 is formed of a thin plate member 21 such as a printed circuit board or a wiring board. The thin plate member 21 of the first waveguide section 20 has first waveguide holes 22 formed at positions corresponding to the launchers LC, respectively. The first waveguide holes 22 propagate electromagnetic waves transmitted and received by the launchers LC. That is, the first waveguide section 20 is formed with the first waveguide holes 22 configured to propagate electromagnetic waves transmitted and received by the launchers LC.

The first waveguide holes 22 are formed of through holes that penetrate the thin plate member 21 from a front surface to a rear surface. The first waveguide holes 22 are formed by a drill or the like. Each of the first waveguide holes 22 has an opening shape that is substantially the same as an opening portion 321 of each of second waveguide holes 32 described later. Although not shown, a metal coating of about 1 μm containing aluminum, copper, silver, or the like is disposed in each of the first waveguide holes 22.

The second waveguide section 30 is formed of a plate member 31 having a thickness greater than a thickness of the thin plate member 21. The second waveguide section 30 has a facing surface 301 that faces the first waveguide section 20 and an outer surface 302 on the opposite side to the facing surface 301. The second waveguide section 30 has second waveguide holes 32 and choke grooves 33. The second waveguide holes 32 penetrate the plate member 31 from the facing surface 301 to the outer surface 302. The choke grooves 33 are formed in the facing surface 301 to surround at least portions of the second waveguide holes 32.

Although not shown, the second waveguide section 30 is formed by coating a resin molded product made of a resin material such as acrylonitrile butadiene styrene (ABS) or poly phenylene ether (PPE) with a metal film of about 1 μm containing aluminum, copper, silver, or the like.

The second waveguide section 30 is formed by pouring molten resin into a mold and solidifying it to form the resin molded product in which the second waveguide holes 32 and the choke grooves 33 are formed, and then forming the metal film over the entire surface of the resin molded product by sputtering, vapor deposition, or the like. Since a thickness of the metal film is sufficiently small compared to the resin molded product, the metal film is not shown in each drawing.

The second waveguide holes 32, the number of which is the same as the number of the first waveguide holes 22, are formed so as to open opposite the first waveguide holes 22. The opening portions 321 of the second waveguide holes 32 open on the facing surface 301 of the second waveguide section 30 facing the first waveguide section 20. The opening portions 321 are shaped to generate a transverse electric (TE) mode in which an electric field vector of an electromagnetic wave is perpendicular to a direction in which the electromagnetic wave propagates.

Figure 3:
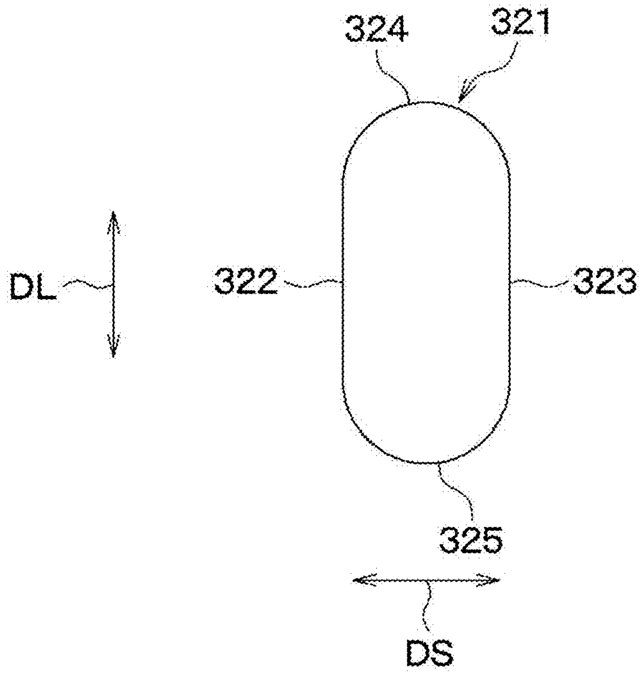
FIG. 3 is an explanatory diagram for explaining a shape of an opening portion of a waveguide hole provided in the waveguide.

As shown in FIG. 3, in the second waveguide hole 32 of the present embodiment, the opening portion 321 has an elongated hole shape. In the present embodiment, a direction along a major axis of the opening portion 321 of the second waveguide hole 32 is referred to as a major axis direction DL, and a direction along a minor axis of the opening portion 321 of the second waveguide hole 32 is referred to as a minor axis direction DS.

Specifically, the opening portion 321 of the second waveguide hole 32 has a substantially elliptical opening shape. The opening portion 321 of the second waveguide hole 32 has a pair of major axis sides 322, 323 extending in the major axis direction DL, a first minor axis side 324 connecting one ends of the pair of major axis sides 322, 323, and a second minor axis side 325 connecting the other ends of the pair of major axis sides 322, 323. The pair of major axis sides 322, 323 extend linearly along the major axis direction DL. The first minor axis side 324 and the second minor axis side 325 are each substantially semicircular.

In the waveguide 10 configured as described above, the first waveguide section 20 and the second waveguide section 30 are assembled with a predetermined gap therebetween to accommodate warping and the like caused by differences in thermal expansion between the first waveguide section 20 and the second waveguide section 30. The first waveguide section 20 and the second waveguide section 30 are assembled, for example, by inserting an engaging protruding portion formed on one of the first waveguide section 20 and the second waveguide section 30 into an engaging recessed portion formed on the other one. It should be noted that the first waveguide section 20 and the second waveguide section 30 may be assembled by other methods.

In the radar device 1, the number of antennas is virtually increased by MIMO technology using multiple transmitting antennas and multiple receiving antennas, thereby improving the azimuth resolution. In view of this situation, there is a demand for an antenna with multi-channel transmission and reception.

However, the package PG is generally sized at a maximum of about 10 mm square, and if a multi-channel launchers LC are installed in this small area, there is a concern that the isolation will deteriorate due to inter-channel coupling.

Furthermore, when a structure is formed in which there is a gap between the first waveguide section 20 and the second waveguide section 30, as in the case of the waveguide 10 of the present embodiment, the electromagnetic field may leak from the gap, resulting in a deterioration of the isolation.

In response to this issue, for example, it is conceivable to ensure a large interval between the adjacent opening portions 321 of the second waveguide holes 32 in the second waveguide section 30 to ensure the isolation between the adjacent second waveguide holes 32.

However, when the interval between the adjacent opening portions 321 of the second waveguide holes 32 is increased, an interval between adjacent first waveguide holes 22 and an arrangement interval between the launchers LC are also increased, which inevitably results in an increase in the size of the package PG.

In light of these circumstances, the present inventors have conducted diligent studies on the waveguide 10 that can ensure the isolation. The results of the diligent studies by the present inventors will be described below with reference to FIGS. 4 to 7. FIGS. 4 to 7 show the relationship between the interval GAP between the opening portions 321 of the second waveguide holes 32 when electromagnetic waves are propagated from the first waveguide section 20 to the second waveguide section 30, and the isolation and the transmission characteristic S21 as the propagation characteristic of the waveguide 10. In FIGS. 4 to 7, shapes and dimensions of the opening portions 321 and the choke grooves 33 are the same. The frequency of the electromagnetic waves is set to 76.5 GHz, which is an operating frequency generally used in millimeter wave radar.

Figure 4:
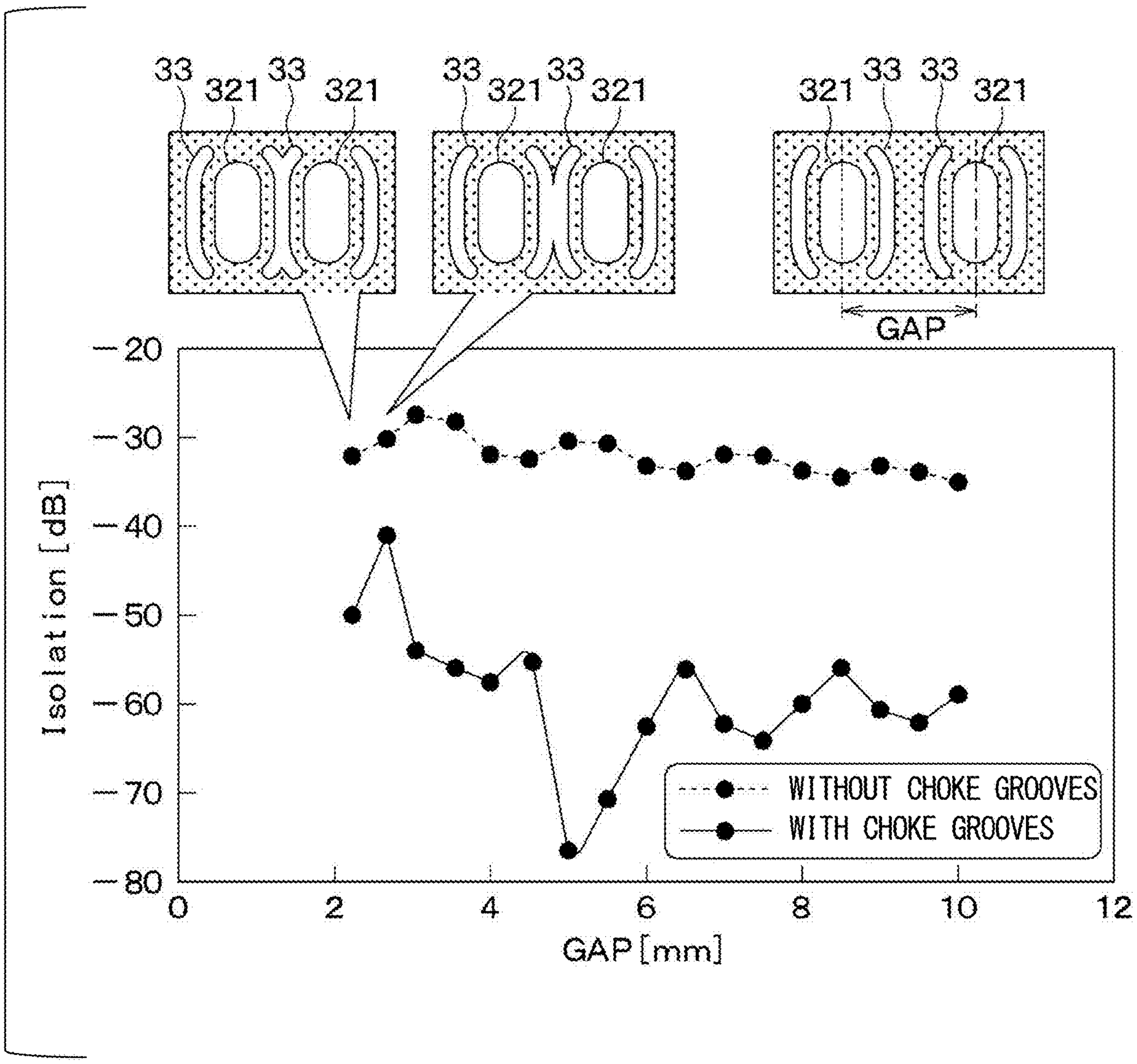
FIG. 4 is an explanatory diagram for explaining the isolation in cases where waveguide holes are arranged so that major axis sides of opening portions face each other.

FIG. 4 shows the measurement results of the isolation when the second waveguide holes 32 were arranged so that the major axis sides 322, 323 of the adjacent opening portions 321 of the second waveguide holes 32 face each other. As shown in FIG. 4, when the choke grooves 33 were not formed around the opening portions 321 of the second waveguide holes 32, the isolation was approximately −30 dB, regardless of the interval GAP between the opening portions 321.

On the other hand, when the choke grooves 33 were formed around the opening portions 321 of the second waveguide holes 32, the isolation was smaller than the isolation when the choke grooves 33 were not formed. It is also found that the isolation vary greatly depending on the interval GAP between the opening portions 321.

Figure 5:
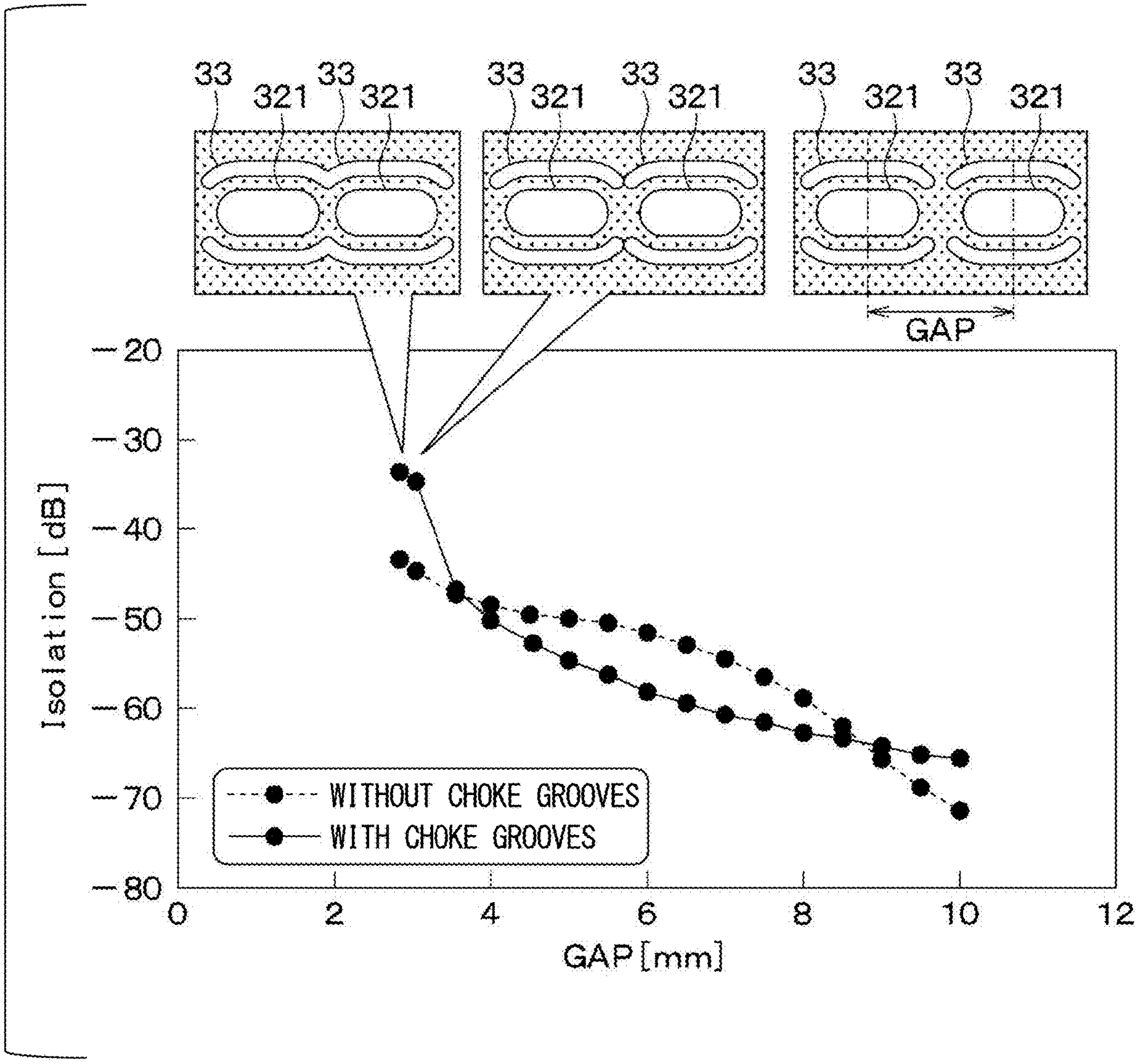
FIG. 5 is an explanatory diagram for explaining the isolation in cases where waveguide holes are arranged so that minor axis sides of opening portions face each other.

FIG. 5 shows the measurement results of the isolation when the second waveguide holes 32 were arranged so that the minor axis sides 324, 325 of the adjacent opening portions 321 of the second waveguide holes 32 face each other. As shown in FIG. 5, when the choke grooves 33 were not formed around the opening portions 321 of the second waveguide holes 32, the isolation was −40 dB or less. It was also found that the isolation decreases with an increase in the interval GAP between the opening portions 321.

On the other hand, when the choke grooves 33 were formed around the opening portions 321 of the second waveguide holes 32, the isolation varies in the range of −60 dB to −30 dB. It was also found the isolation vary greatly depending on the interval GAP between the opening portions 321.

Figure 6:
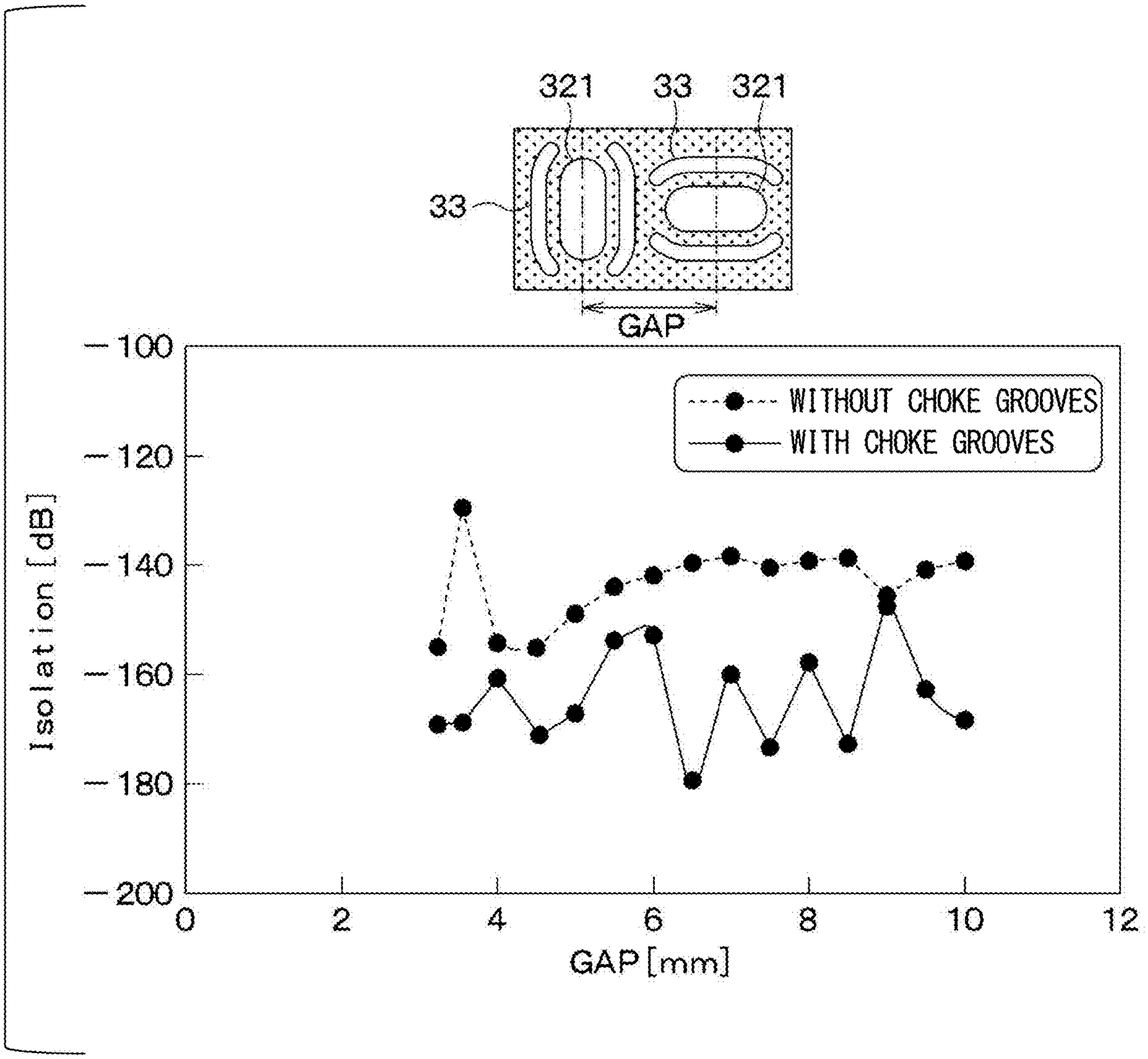
FIG. 6 is an explanatory diagram for explaining the isolation in cases where waveguide holes are arranged so that a minor axis side of an opening portion and a major axis side of another opening portion face each other.

FIG. 6 shows the measurement results of the isolation when the second waveguide holes 32 were arranged so that the minor axis sides 324, 325 and the major axis sides 322, 323 of the adjacent opening portions 321 of the second waveguide holes 32 face each other.

As shown in FIG. 6, when the choke grooves 33 were not formed around the opening portions 321 of the second waveguide holes 32, the isolation was −120 dB or less. In addition, when the choke grooves 33 were formed around the opening portions 321 of the second waveguide holes 32, the isolation was −140 dB or less. It was also found that the isolation vary greatly depending on the interval GAP between the opening portions 321.

From the measurement results shown in FIGS. 4 to 6, the inventors have found that the isolation can be significantly improved by arranging the adjacent opening portions 321 of the second waveguide holes 32 so that their respective major axis directions DL intersect with each other.

Figure 7:
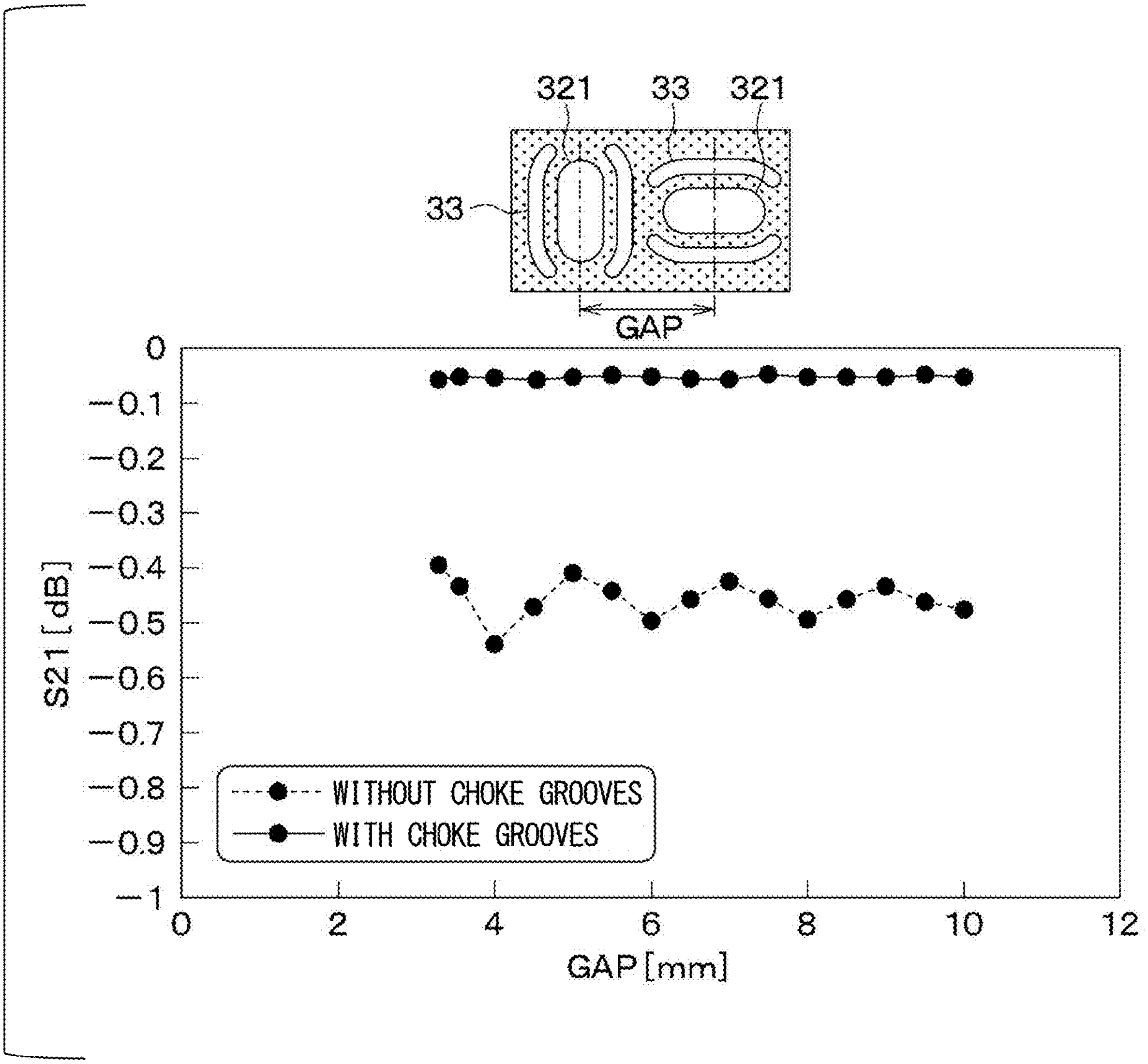
FIG. 7 is an explanatory diagram for explaining transmission characteristics in cases where waveguide holes are arranged so that a minor axis side of an opening portion and a major axis side of adjacent opening portion face each other.

FIG. 7 shows the measurement results of the transmission characteristic S21 when the second waveguide holes 32 are arranged so that the minor axis sides 324, 325 and the major axis sides 322, 323 of the adjacent opening portions 321 of the second waveguide holes 32 face each other. The transmission characteristic S21 is a parameter indicating a transfer characteristic from an input to an output, and is also called a transmission loss.

As shown in FIG. 7, when the choke grooves 33 were not formed around the opening portions 321 of the second waveguide holes 32, energy leaked at about −0.5 dB regardless of the interval GAP between the opening portions 321.

On the other hand, when the choke grooves 33 were formed around the opening portions 321 of the second waveguide holes 32, the energy was approximately zero dB regardless of the interval GAP between the opening portions 321, and almost no leakage occurs.

From the measurement results shown in FIG. 7 and the like, the inventors have found that by providing the choke grooves 33 around the adjacent opening portions 321 of the second waveguide holes 32, the transmission characteristic S21 is improved compared to the case where the choke grooves 33 are not provided.

Based on these findings, the present inventors have devised a connection structure for the waveguide 10 suitable for improving the isolation and the transmission characteristic S21. In this connection structure, in order to improve the isolation, the adjacent opening portions 321 of the second waveguide holes 32 are arranged so that their major axis directions DL intersect with each other.

Figure 8:
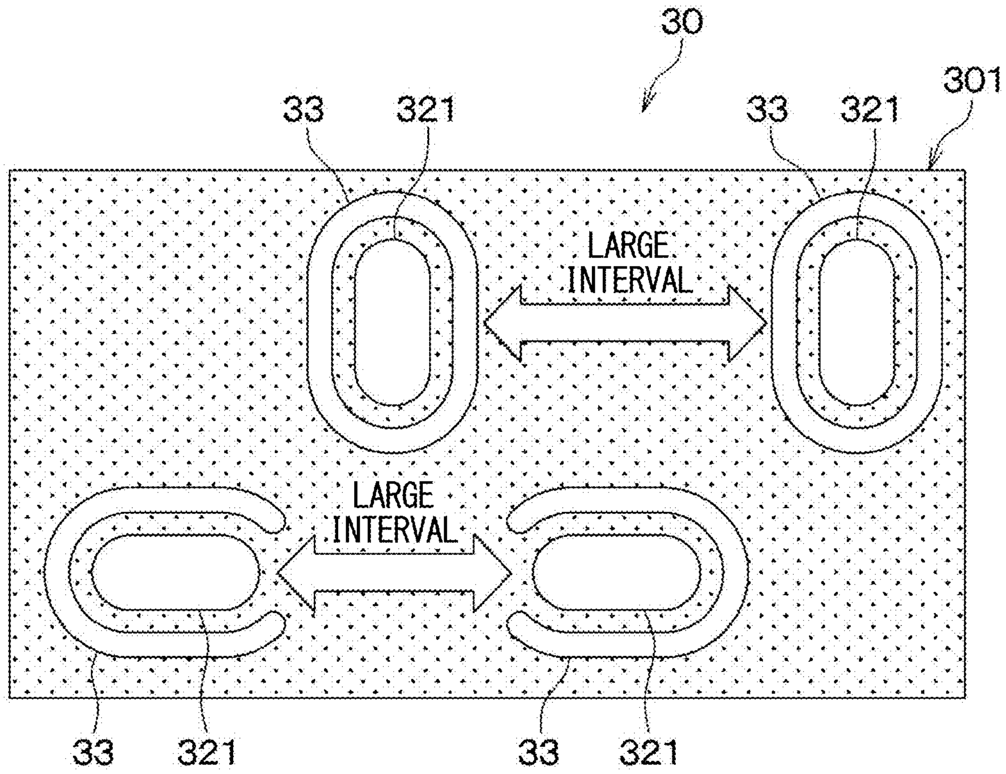
FIG. 8 is an explanatory diagram for explaining the isolation when an interval between adjacent opening portions in a second waveguide section is large.

However, for example, as shown in FIG. 8, for the second waveguide holes 32 that are farther apart than a predetermined value, a certain degree of isolation is ensured. Therefore, among the second waveguide holes 32, the second waveguide holes 32 whose opening portions 321 are adjacent to each other with an interval of a predetermined value or less are arranged such that the major axis directions DL of the opening portions 321 intersect with each other. Among the second waveguide holes 32, those in which the opening portions 321 are adjacent to each other by more than a predetermined value (for example, 0.5 wavelengths) may be arranged so that the major axis directions DL of the opening portions 321 intersect with each other, or may be arranged so that the major axis directions DL of the opening portions 321 are approximately parallel to each other. The "predetermined value" is set to a distance that ensures a certain degree of isolation. The distance at which a certain degree of isolation can be ensured is obtained, for example, by simulation, experiment, or the like.

In this manner, the isolation can be ensured by arranging the adjacent opening portions 321 of the second waveguide holes 32 such that the major axis directions DL are substantially perpendicular to each other. Note that the isolation can be improved with an increase in an angle between the major axis directions DL of the adjacent opening portions 321 (that is, an intersection angle). Taking such characteristics into consideration, it is desirable that the second waveguide holes 32 are arranged such that the intersection angle of the major axis directions DL of the adjacent opening portions 321 is within a range of 45 degrees to 90 degrees.

As described above, isolation can be ensured by devising an arrangement of the adjacent opening portions 321 of the second waveguide holes 32. However, in a structure in which there is a gap between the waveguide sections 20, 30, energy that causes transmission loss wanders through the gap. This may have adverse effects on other waveguide holes. In order to avoid the adverse effects, in the second waveguide section 30 of the present embodiment, the choke grooves 33 are formed between the adjacent opening portions 321 of the second waveguide holes 32.

Figure 9:
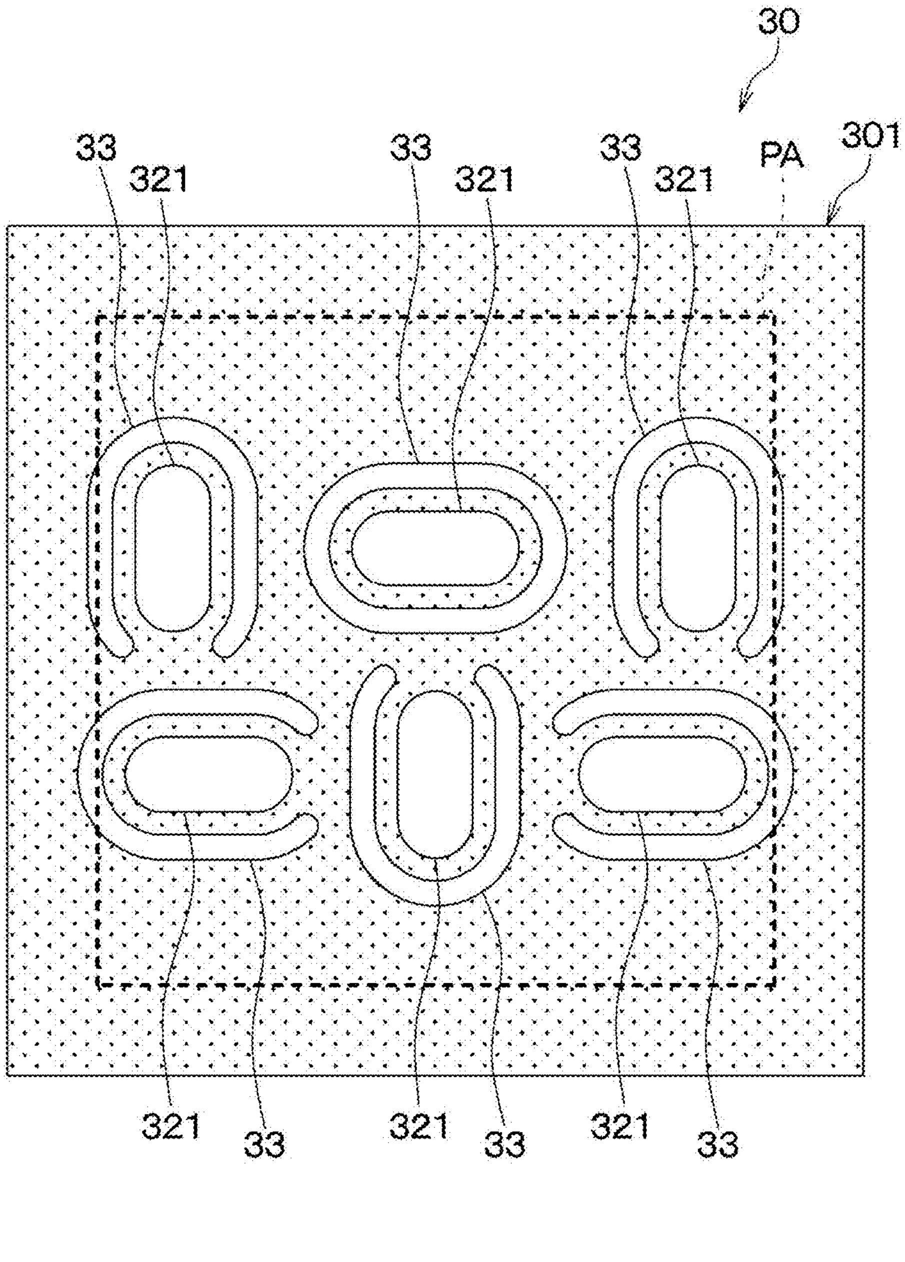
FIG. 9 is a schematic plan view showing a part of a surface of the second waveguide section facing a first waveguide section.

As shown in FIG. 9, the second waveguide section 30 of the present embodiment has six second waveguide holes 32 arranged therein. The opening portions 321 of the six second waveguide holes 32 are provided so as to be arranged within a placement area PA of the package PG. Incidentally, since there is no restriction on the size of the package PG, the choke grooves 33 may be formed outside the placement area PA of the package PG.

The second waveguide holes 32 formed in the second waveguide section 30 are arranged such that the major axis directions DL of the adjacent opening portions 321 are substantially perpendicular to each other. When the opening portions 321 of the second waveguide holes 32 arranged in a row in a predetermined direction are defined as a "waveguide hole row", the second waveguide section 30 has two waveguide hole rows, each including the opening portions 321 of three second waveguide holes 32, arranged in a direction perpendicular to the predetermined direction.

Each of the waveguide hole rows is arranged so that the major axis direction DL of the opening portions 321 of the second waveguide holes 32 located at both ends intersects with the major axis direction DL of the opening portions 321 of the second waveguide holes 32 located between the opening portions 321 of the second waveguide holes 32 located at both ends.

Specifically, in the waveguide hole rows, an upper hole row that is a first row from a top of FIG. 9 is arranged so that the major axis directions DL of the opening portions 321 of the second waveguide holes 32 located at both ends are parallel to each other and are approximately perpendicular to the major axis direction DL of the opening portion 321 of the second waveguide hole 32 located between them. In addition, in the waveguide hole rows, a lower hole row that is a second row from the top of FIG. 9 is arranged so that the minor axis directions DS of the opening portions 321 of the second waveguide holes 32 located at both ends are parallel to each other and are approximately perpendicular to the minor axis directions DS of the opening portions 321 of the second waveguide holes 32 located between them.

As a result, the upper hole row and the lower hole row in the present embodiment are arranged so that the major axis directions DL of the opening portions 321 of the second waveguide holes 32 that are adjacent to each other in the vertical direction of FIG. 9 are approximately perpendicular to each other.

Figure 10:
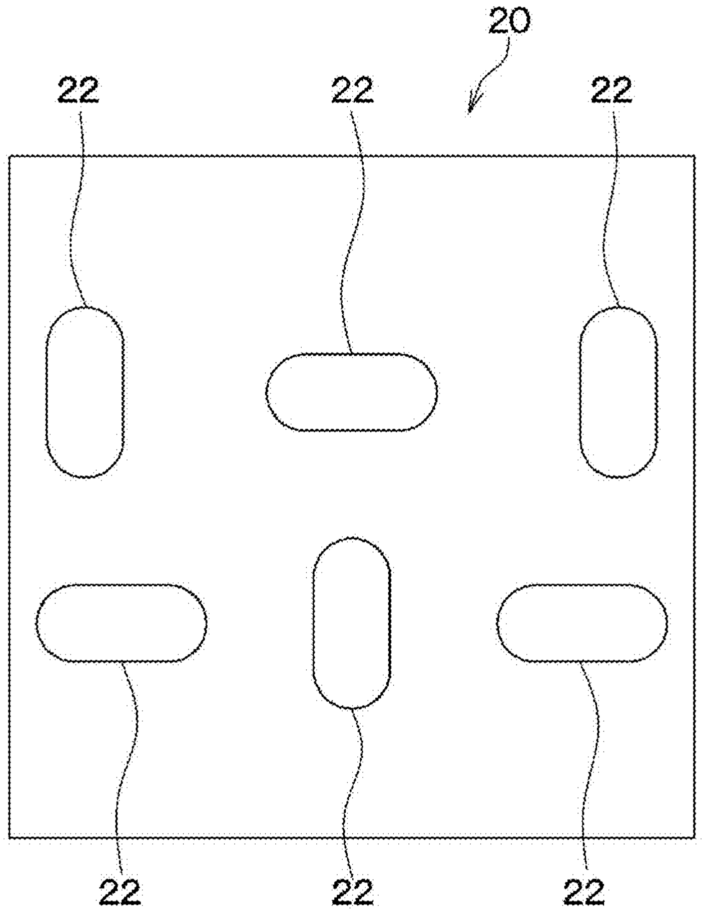
FIG. 10 is a schematic plan view showing a part of a surface of the first waveguide section facing the second waveguide section.

As shown in FIG. 10, the first waveguide section 20 has six first waveguide holes 22 opening at positions corresponding to the opening portions 321 of the second waveguide holes 32. An opening shape of each of the first waveguide holes 22 is similar to the opening shape of the opening portion 321 of each of the second waveguide holes 32.

At least one choke groove 33 is provided between the adjacent opening portions 321 of the second waveguide holes 32. In the second waveguide section 30 of the present embodiment, the choke grooves 33 are formed around the opening portions 321 of all the second waveguide holes 32.

Figure 11:
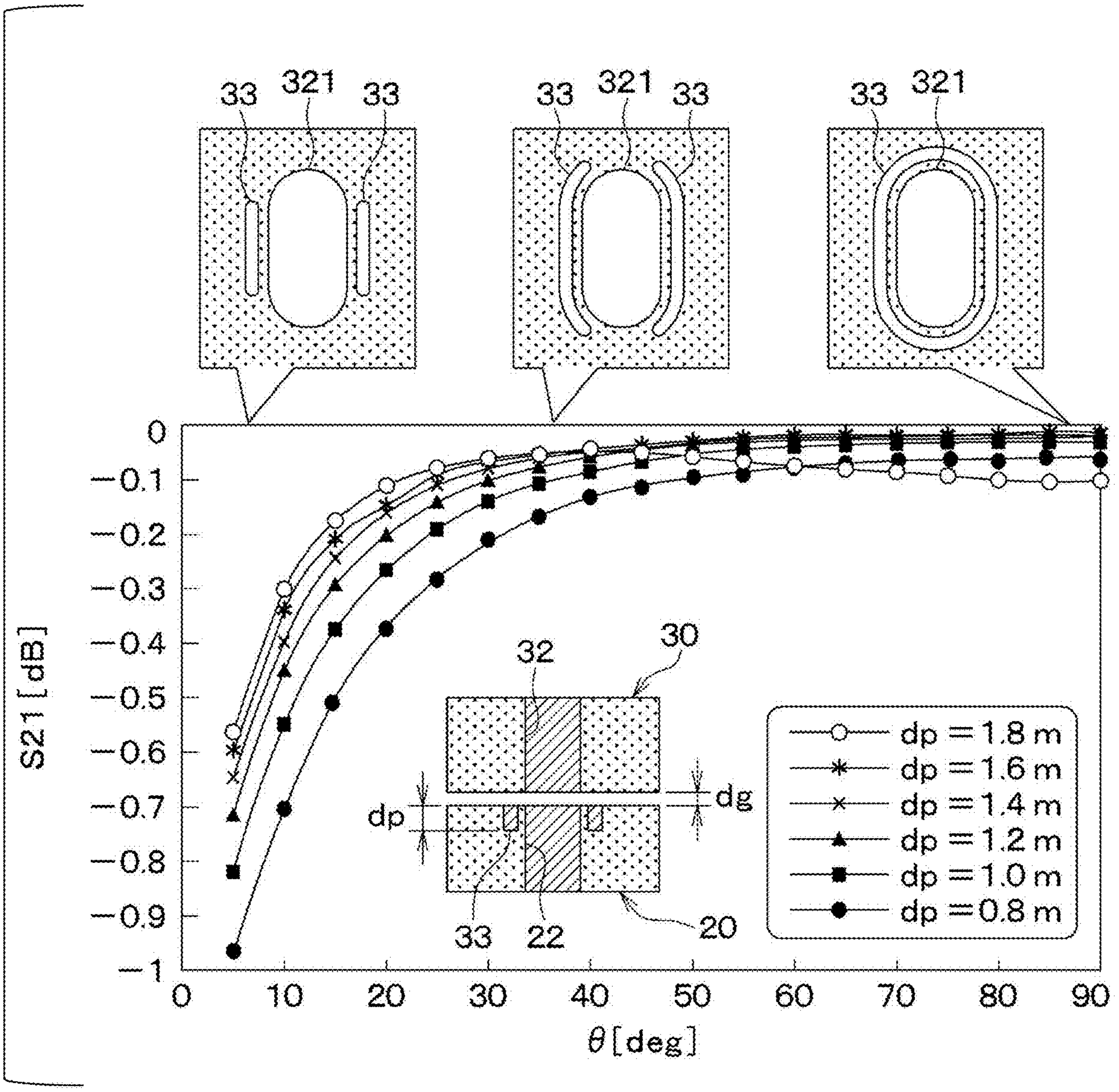
FIG. 11 is an explanatory diagram for explaining a relationship between a groove depth of choke grooves and transmission characteristics.

The present inventors have conducted diligent studies on the relationship between a groove depth dp of the choke grooves 33 and the transmission characteristic S21, and obtained the results shown in FIG. 11. FIG. 11 shows the results when a typical operating frequency was 76.5 GHz and an electrically effective wavelength $\lambda$ is 3.92 mm. Moreover, FIG. 11 shows the results of changing a groove angle $\theta$ in the choke grooves 33, where an angle formed by a virtual line passing through one end of a portion of the second waveguide hole 32 that follows an arc and the center of the arc, and a virtual line passing through the other end of the portion of the second waveguide hole 32 that follows the arc and the center of the arc is defined as the groove angle $\theta$. FIG. 11 also shows the results when the groove depth dp of the choke grooves 33 is changed in increments of 0.2 mm in a range from 0.8 mm to 1.8 mm.

As shown in FIG. 11, the transmission characteristic S21 approaches 0 with an increase in the groove angle $\theta$. In other words, the transmission characteristic S21 approaches 0 with an increase in an area surrounding the opening portions 321 of the second waveguide holes 32 by the choke grooves 33. The results also showed that the transmission characteristic S21 approaches 0 with an increase in the groove depth dp of the choke grooves 33.

Figure 12:
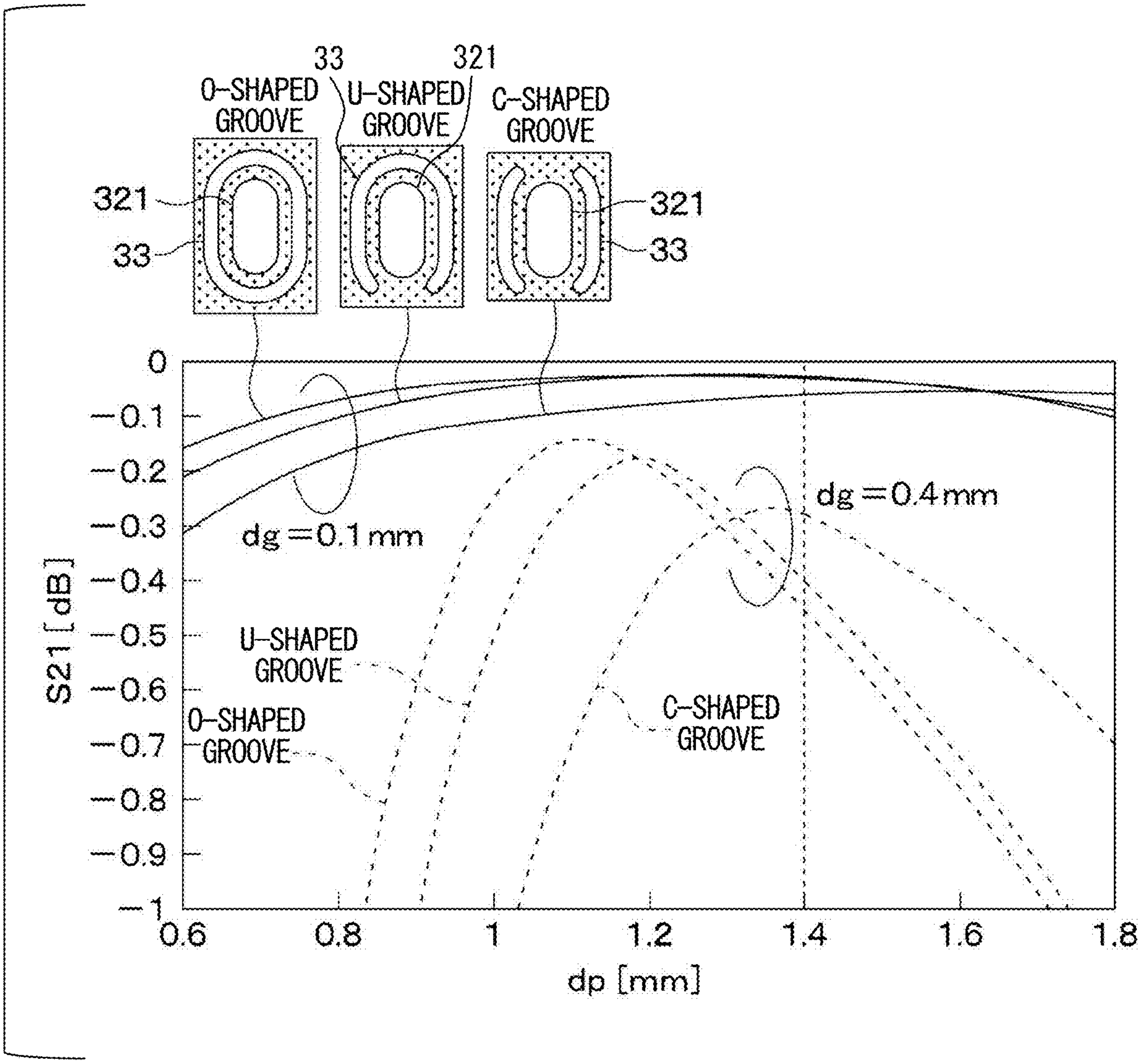
FIG. 12 is an explanatory diagram for explaining a relationship between a groove shape of choke grooves and transmission characteristics.

The present inventors also conducted diligent studies on the relationship between a shape of each of the choke grooves 33 and the transmission characteristic S21, and obtained the results shown in FIG. 12. FIG. 12 shows the transmission characteristic S21 when each of the choke grooves 33 is an "O-shaped groove", a "C-shaped groove", or a "U-shaped groove". The "O-shaped groove" is a choke groove 33 having a shape that surrounds the entire periphery of the opening portion 321 of the second waveguide hole 32. The "U-shaped groove" is a choke groove 33 obtained by removing a portion of the "O-shaped groove" corresponding to one of the pair of minor axis sides 324, 325. The "C-shaped groove" is a choke groove 33 obtained by removing portions of the "O-shaped groove" corresponding to both of the pair of minor axis sides 324, 325.

As shown in FIG. 12, it was found that the transmission characteristic S21 according to the groove depth dp changes to have an extreme value with an increase in the guide section gap dg. Specifically, when the guide section gap was 0.4 mm, the optimal value of the transmission characteristic S21 was a groove depth dp of approximately 1.05 mm for the "O-shaped groove", a groove depth dp of approximately 1.15 mm for the "U-shaped groove", and a groove depth dp of approximately 1.35 mm for the "U-shaped groove".

When the second waveguide section 30 is manufactured using a mold as in the present embodiment, it is desirable that the groove depths dp of all the choke grooves 33 are uniform. For example, when the groove depth dp of the choke groove 33 is standardized to 1.4 mm and the guide section gap dg is 0.4 mm, the transmission characteristics S21 will be worse for the "U-shaped groove" and "O-shaped groove" than for the "C-shaped groove". Therefore, it is desirable to set the groove depth dp of the choke groove 33 to a value obtained by averaging the optimal values of the transmission characteristic S21 for each of the "O-shaped groove", the "U-shaped groove", and the "C-shaped groove" (for example, 1.25 mm), so as to restrict deterioration of the transmission characteristic S21.

In addition, the choke groove 33 may be configured as at least one of the "O-shaped groove" and the "U-shaped groove", and the groove depth dp of the choke groove 33 may be set to a value obtained by averaging the optimal values of the transmission characteristic S21 for the "O-shaped groove" and the "U-shaped groove" (for example, 1.1 mm). This makes it possible to ensure a sufficient transmission characteristic S21.

Figure 13:
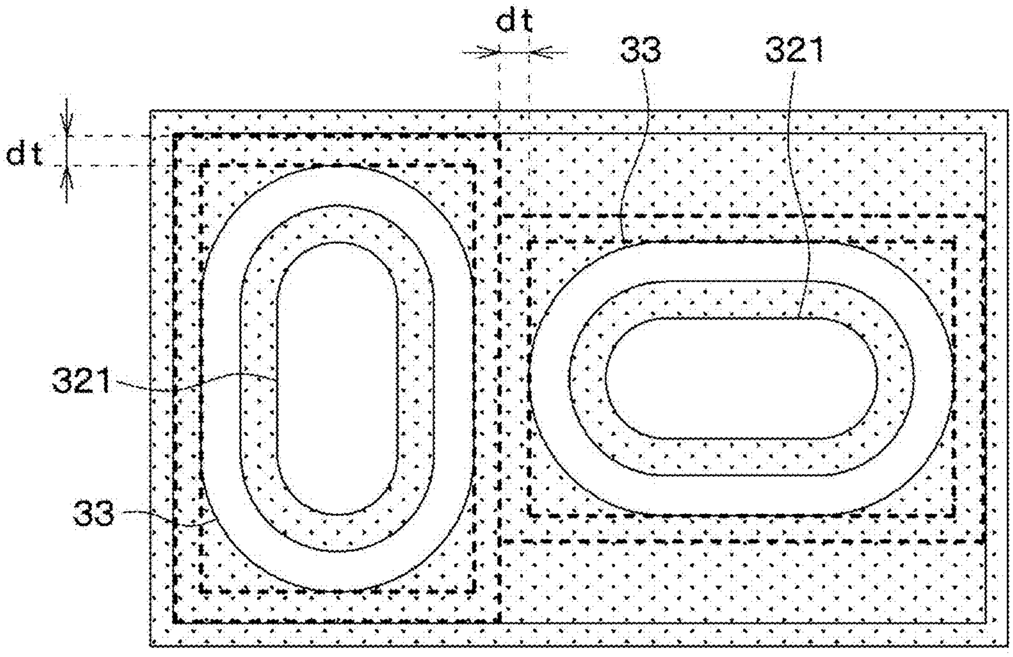
FIG. 13 is an explanatory diagram for explaining a thickness required around choke grooves of O-shape.
Figure 14:
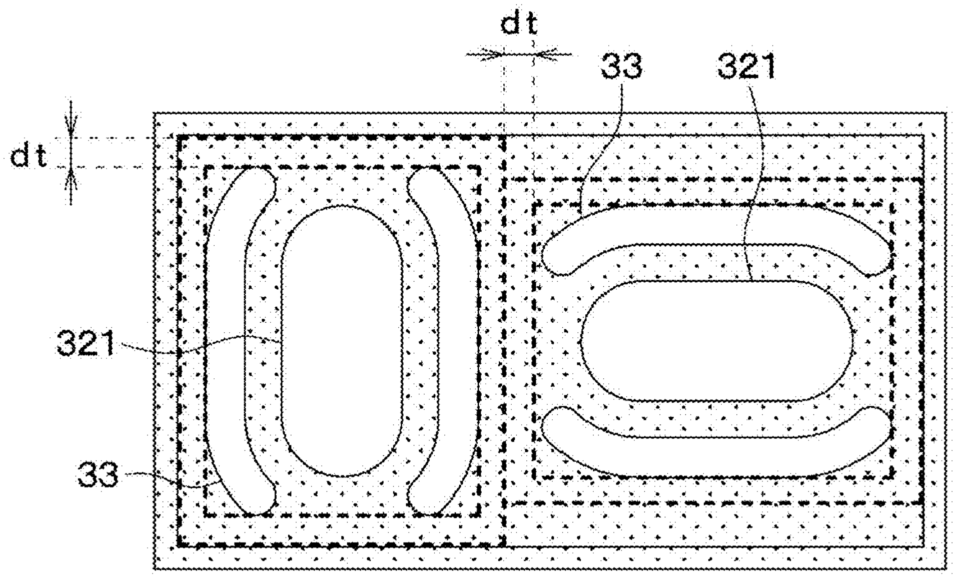
FIG. 14 is an explanatory diagram for explaining a thickness required around choke grooves of C-shape.

For example, when a resin molding of the second waveguide section 30 is made of acrylonitrile butadiene styrene (ABS) resin, in order to ensure strength, it is necessary to ensure that a groove outer thickness dt, which is a thickness on an outside of the choke groove 33, is 0.3 mm to 0.35 mm or more. Therefore, the configuration in which the choke groove 33 of the "O-shaped groove" is provided around the opening portion 321 of the second waveguide section 30 becomes larger in the major axis direction DL than the configuration in which the choke groove 33 of the "C-shaped groove" is provided around the opening portion 321. For example, in the configuration in which the choke grooves 33 are formed as the "O-shaped grooves" as shown in FIG. 13, the interval between the adjacent opening portions 321 of the second waveguide section 30 becomes larger than in the configuration in which the choke grooves 33 are formed as the "C-shaped grooves" as shown in FIG. 14. An increase in the interval between the adjacent opening portions 321 of the second waveguide section 30 leads to an increase in the size of the package PG. That is, while the configuration in which the choke grooves 33 are formed as the "O-shaped grooves" contributes to improving the isolation, there is a possibility that the package PG will become larger.

Taking these into consideration, the second waveguide section 30 of the present embodiment is provided with a choke groove 33 in the form of an "O-shaped groove" and a choke groove 33 in the form of a "U-shaped groove" on the opposing surface 301. In the present embodiment, as shown in FIG. 9, a choke groove 33 is provided around the opening portion 321 of the second waveguide hole 32 constituting the waveguide hole row, so as to extend along each of the major axis sides 322, 323 and at least one of the first minor axis side 324 and the second minor axis side 325.

Specifically, in the second waveguide section 30, an "O-groove" choke groove 33 is formed around the opening portion 321 of one second waveguide hole 32, and a "U-groove" choke groove 33 is formed around the opening portions 321 of five second waveguide holes 32.

The "U-shaped" choke grooves 33 are provided such that a portion where no choke groove 33 is formed faces a portion of the adjacent choke groove 33 extending along the major axis sides 322, 323. In other words, the portion of the "U-shaped groove" choke groove 33 extending along the minor axis sides 324, 325 is provided on the opposite side to the portion facing the choke groove 33 and the opening portion 321 of the second waveguide hole 32. With this configuration, leakage of electromagnetic waves to the outside from areas where the choke grooves 33 are not formed is restricted.

In the second waveguide section 30, if there is sufficient space to provide the opening portions 321, it is desirable to arrange the choke grooves 33 in the form of the O-shaped grooves" preferentially over the choke grooves 33 in the form of the "U-shaped grooves". On the other hand, if there is not enough space in the second waveguide section 30 to provide the opening portions 321, it is desirable to arrange the choke grooves 33 in the form of the "U-shaped grooves" preferentially over the choke grooves 33 in the form of the "O-shaped grooves". It is preferable that the choke grooves 33 in the form of the "U-shaped grooves" are disposed such that portions of the choke grooves 33 where no groove exists are located on the opposite sides to the adjacent opening portion 321.

Figure 15:
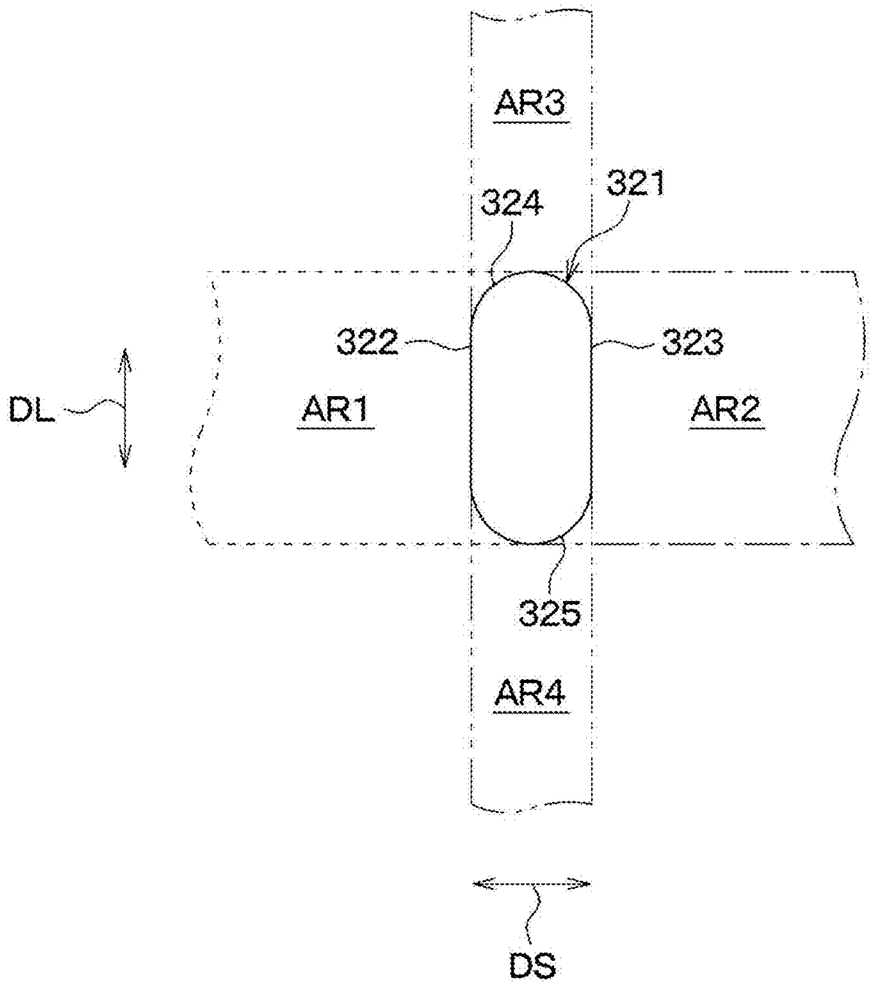
FIG. 15 is an explanatory diagram for explaining a portion surrounding an opening portion of a second waveguide hole.

In the present embodiment, portions surrounding the opening portion 321 of the second waveguide hole 32 on the facing surface 301 are defined as a first peripheral portion AR1, a second peripheral region AR2, a third peripheral region AR3, and a fourth peripheral region AR4, as shown in FIG. 15.

The first peripheral region AR1 is a region surrounding the opening portion 321 of the second waveguide hole 32 and connected to one of the pair of major axis sides 322, 323 in the minor axis direction DS of the opening portion 321. The second peripheral region AR2 is a region surrounding the opening portion 321 of the second waveguide hole 32 connected to the other of the pair of major axis sides 322, 323 in the minor axis direction DS of the opening portion 321.

The third peripheral region AR3 is a region surrounding the opening portion 321 of the second waveguide hole 32 and connected to one of the minor axis sides 324, 325 in the major axis direction DL. The fourth peripheral region AR4 is a region surrounding the opening portion 321 of the second waveguide hole 32 and connected to the other of the minor axis sides 324, 325 in the major axis direction DL.

Figure 16:
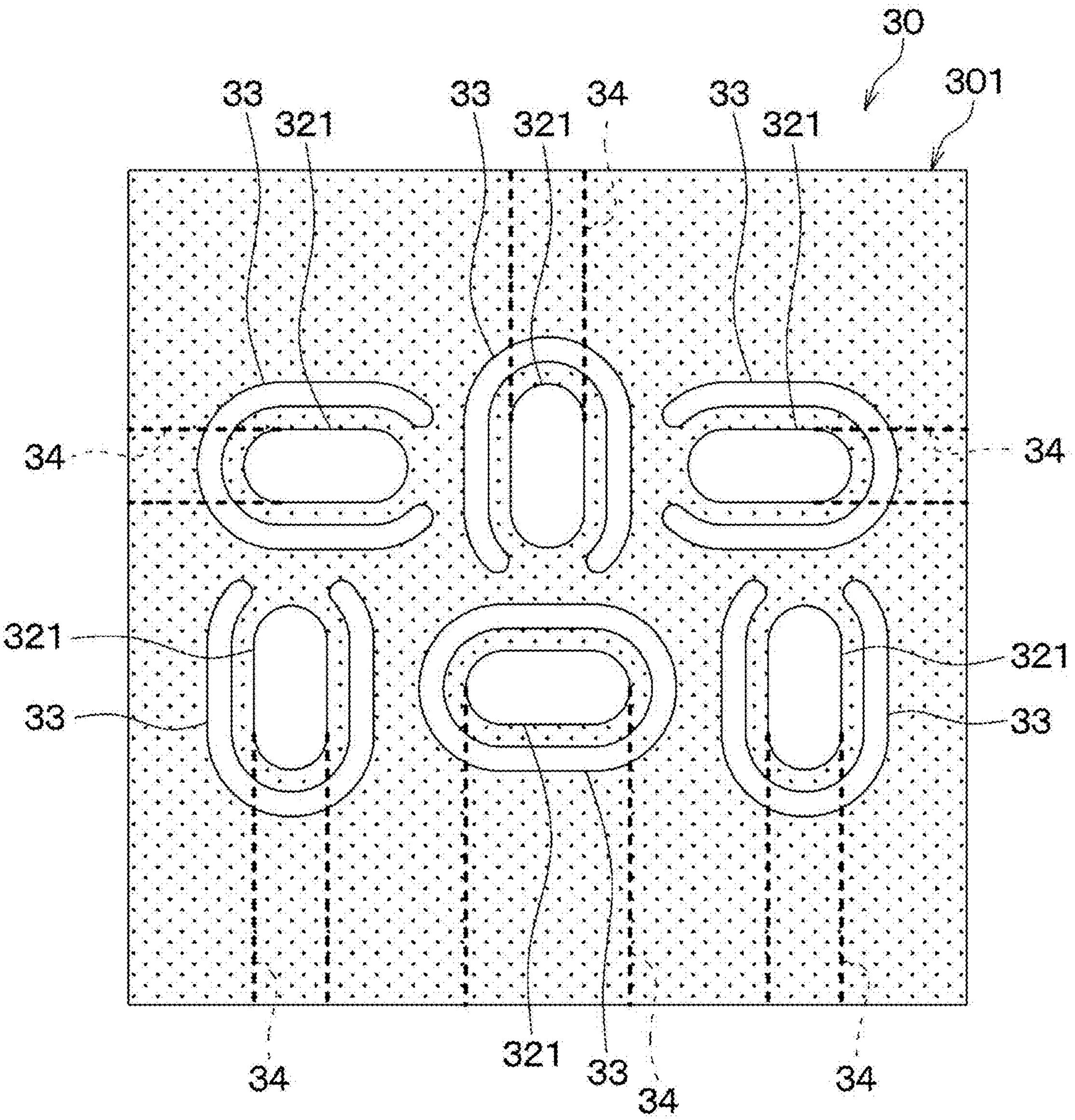
FIG. 16 is an explanatory diagram for explaining waveguide paths of second waveguide holes.

In the second waveguide section 30 of the present embodiment, the opening portions 321 of the second waveguide holes 32 are arranged on the facing surface 301 so that one to three of the peripheral regions AR1 to AR4 are non-opening regions in which the opening portions 321 of the second waveguide holes 32 are not arranged. The second waveguide holes 32 utilize the non-opening regions in the second waveguide section 30, for example as shown in FIG. 16, so that electromagnetic waveguide paths 34 connecting the opening portions on the facing surfaces 301 and the opening portions on the outer surface 302 are drawn out along a direction approximately parallel to the facing surface 301.

Since it is desirable to ensure sufficient isolation between the transmitting antennas and the receiving antennas, rather than isolation between the transmitting antennas or isolation between the receiving antennas, the antennas may be disposed with a die therebetween.

Figure 17:
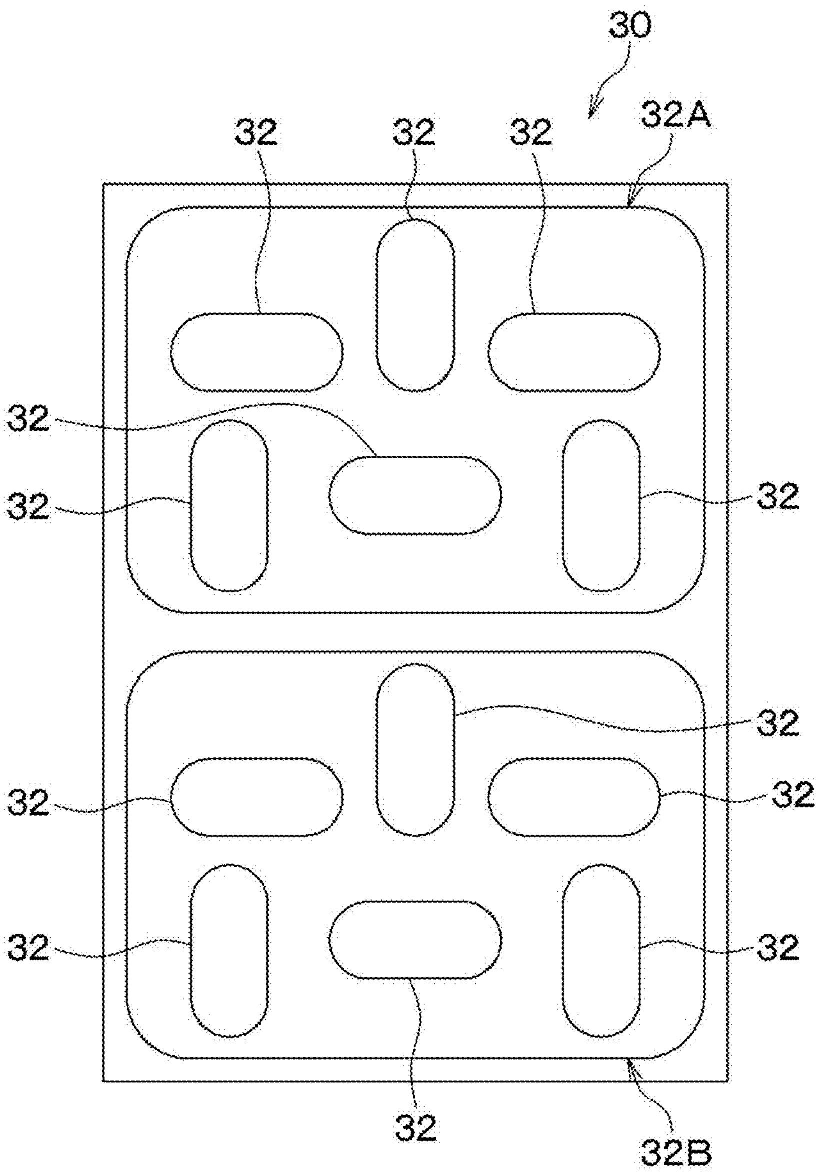
FIG. 17 is an explanatory diagram for explaining a positional relationship between second waveguide holes for transmitting electromagnetic waves and second waveguide holes for receiving electromagnetic waves.

Taking this into consideration, in the radar device 1 of the present embodiment, as shown in, for example, FIG. 17, a waveguide hole group 32A consisting of the second waveguide holes 32 for transmitting electromagnetic waves and a waveguide hole group 32B consisting of the second waveguide holes 32 for receiving electromagnetic waves are arranged at a distance of a predetermined value or more. This makes it possible to ensure a certain degree of isolation between the transmitting antennas and the receiving antennas.

Figure 18:
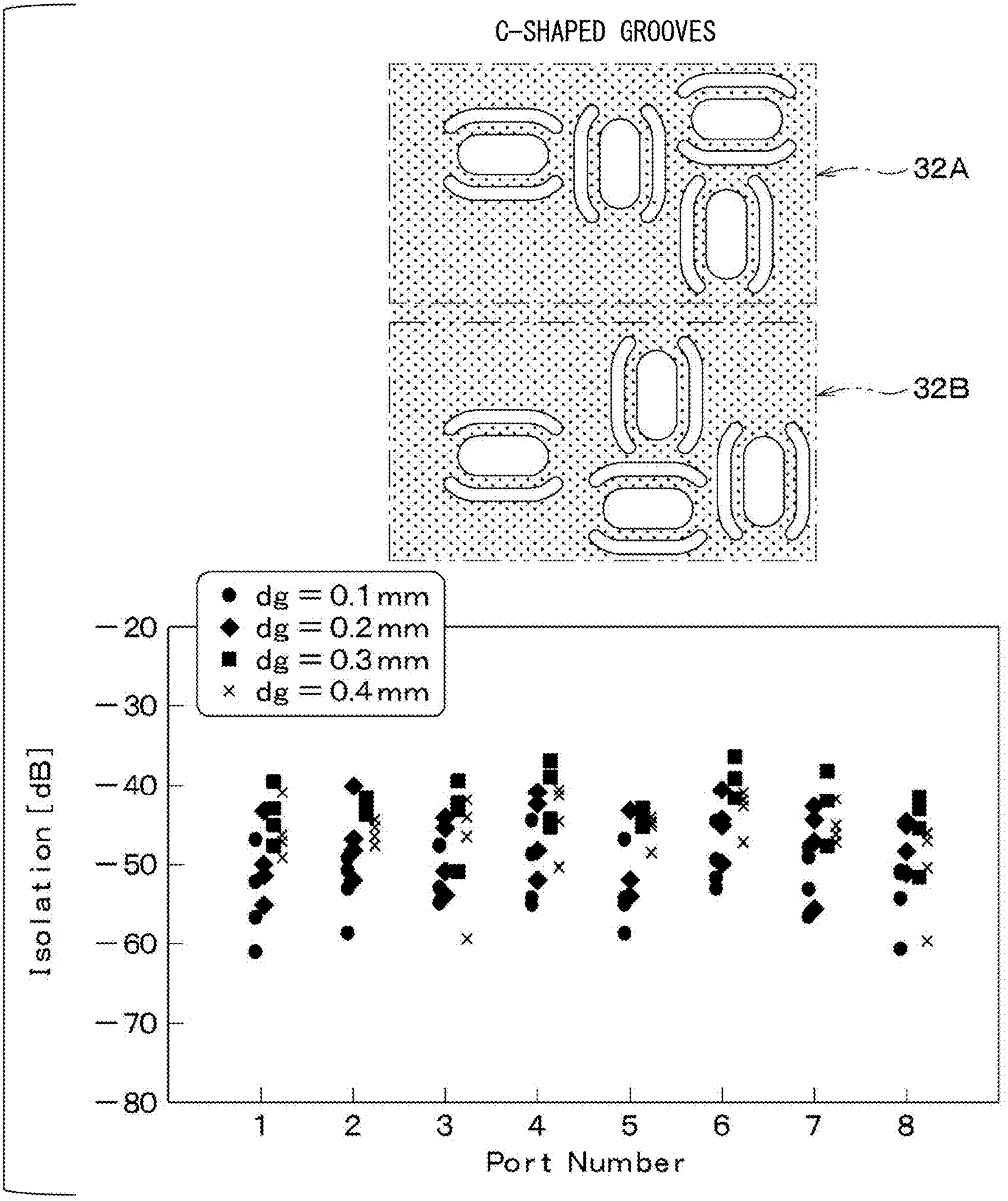
FIG. 18 is an explanatory diagram for explaining the isolation between second waveguide holes for transmission and second waveguide holes for reception in cases where choke grooves of C-shape are provided around the second waveguide holes.
Figure 19:
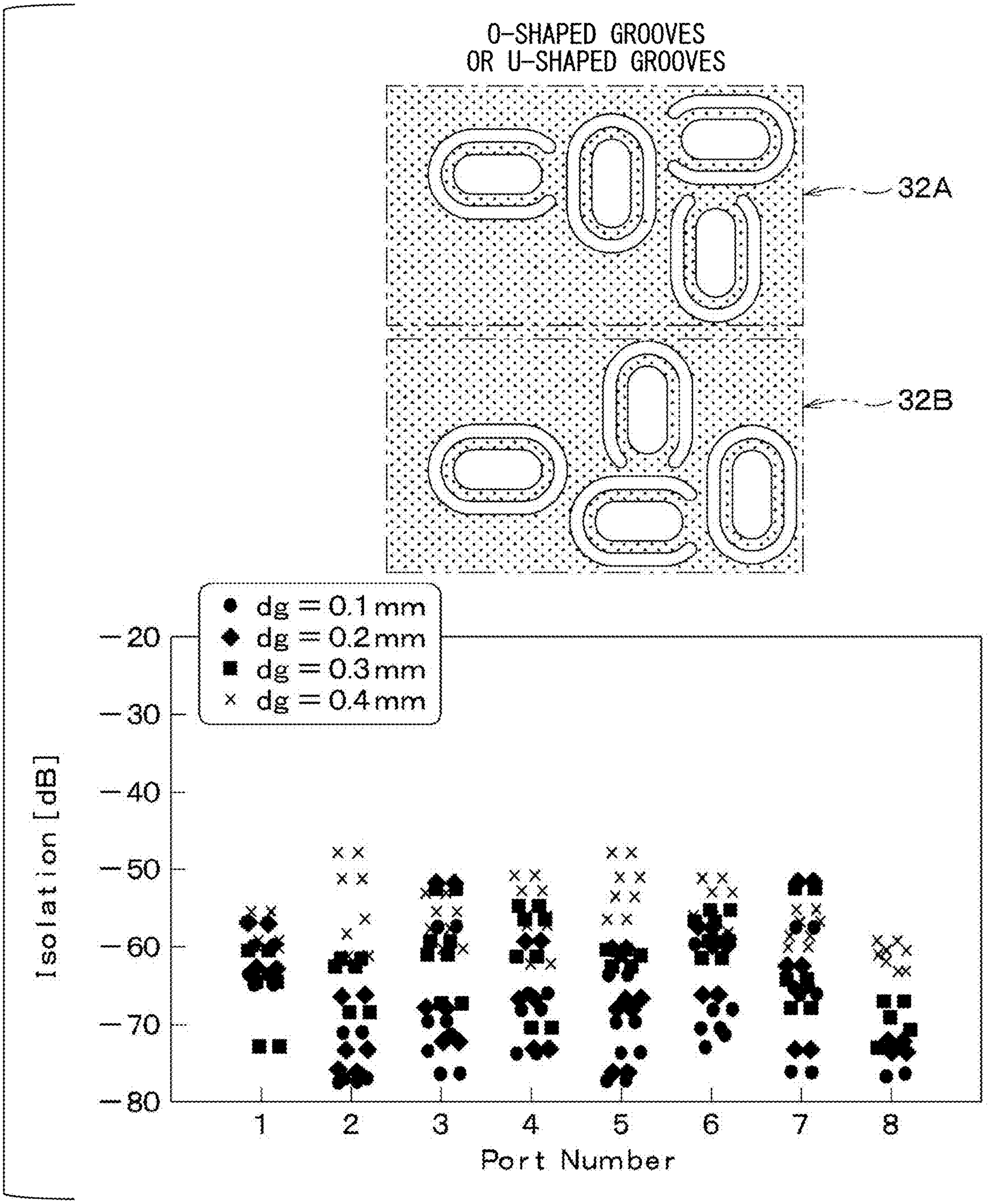
FIG. 19 is an explanatory diagram for explaining the isolation between second waveguide holes for transmission and second waveguide holes for reception in cases where choke grooves of U-shape or O-shape are provided around the second waveguide holes.

FIG. 18 shows the isolation when the choke grooves 33 in the form of the "C-shaped grooves" ware provided around the second waveguide holes 32 and the guide section gap dg was changed from 0.1 mm to 0.4 mm. FIG. 19 shows the isolation when the choke grooves 33 in the form of the "U-shaped grooves" or "O-shaped grooves" are provided around the second waveguide holes 32 and the guide section gap dg was changed from 0.1 mm to 0.4 mm.

As shown in FIGS. 18 and 19, when the choke grooves 33 in the form of the "U-shaped grooves" or the "O-shaped grooves" were provided around the second waveguide holes 32, the isolation was improved compared to when the choke grooves 33 in the form "C-shaped grooves" were provided around the second waveguide holes 32. This was the same even when the guide section gap dg was changed.

In the second waveguide section 30 of the present embodiment, the choke grooves 33 in the form of the "U-shaped grooves" or the "O-shaped grooves" are provided around the opening portions 321 of the second waveguide holes 32, so that the isolation between the second waveguide holes 32 for transmission and the second waveguide holes 32 for reception can be sufficiently improved.

In the radar device 1 configured in this manner, when electromagnetic waves are output from the launchers LC of the package PG, the electromagnetic waves pass through the first waveguide holes 22 of the first waveguide section 20 and reach between the first waveguide section 20 and the second waveguide section 30. The electromagnetic waves that reach between the first waveguide section 20 and the second waveguide section 30 are input into the waveguide paths 34 from the opening portions 321 of the second waveguide holes 32 of the second waveguide section 30, and then radiated into the external space through the opening portions formed on the outer surface 302. For example, when the launchers LC of the package PG receive electromagnetic waves from the external space, the electromagnetic waves propagate in the opposite direction to the electromagnetic waves output from the launchers LC of the package PG described above.

The waveguide 10 described above includes the first waveguide section 20 having the first waveguide holes 22, and the second waveguide section 30 having the second waveguide holes 32 that open to face the first waveguide holes 22, respectively. The number of the second waveguide holes 32 is equal to the number of the first waveguide holes 22. The second waveguide section 30 is disposed with the predetermined gap between the second waveguide section 30 and the first waveguide section 20. Each of the second waveguide holes 32 has the opening portion 321 of the elongated hole shape that opens on the facing surface 301 of the second waveguide section 30 that faces the first waveguide section 20. The direction along the major axis of the opening portion 321 of each of the second waveguide holes 32 is defined as the major axis direction DL. The major axis direction DL of the opening portion 321 of one of the second waveguide holes 32 intersects with the major axis direction DL of the opening portion 321 of another of the second waveguide holes 32 that is adjacent to the one of the second waveguide holes 32.

The above described configuration can ensure the isolation without increasing the interval between the adjacent opening portions 321 of the second waveguide holes 32. Therefore, by bringing the adjacent opening portions 321 of the second waveguide holes 32 closer to each other and reducing the arrangement interval between the launchers LC, it is possible to ensure isolation while restricting the package PG from becoming larger.

In addition, the waveguide 10 has the following features.

Among the second waveguide holes 32, adjacent second waveguide holes 32 whose opening portions 321 are adjacent to each other with an interval of the predetermined value or less may cause deterioration in the isolation. Therefore, it is preferable that, among the second waveguide holes 32, adjacent second waveguide holes 32 whose opening portions 321 are adjacent to each other with the interval of the predetermined value or less are arranged such that the major axis directions DL of the opening portions 321 intersect with each other.

The second waveguide section 30 has the choke groove 33 between the adjacent opening portions 321 of the second waveguide holes 32 that are adjacent to each other with the interval of the predetermined value or less. According to this configuration, the choke groove 33 can restrict deterioration of the isolation caused by electromagnetic waves leaking from the gap between the first waveguide section 20 and the second waveguide section 30.

At the opening portion 321 of the second waveguide hole 32, leakage of the electromagnetic field from the major axis sides 322, 323 is more noticeable than leakage of the electromagnetic field from the minor axis sides 324, 325. For this reason, it is preferable to provide the choke groove 33 around the opening portion 321 of the second waveguide hole 32 so as to extend along the major axis direction DL of the opening portion 321.

Among the second waveguide holes 32, three second waveguide holes 32 are arranged in the predetermined direction to form the waveguide hole row. The waveguide hole row is arranged so that the major axis direction DL of the opening portions 321 of the second waveguide holes 32 located at both ends intersects with the major axis direction DL of the opening portions 321 of the second waveguide holes 32 located between the opening portions 321 of the second waveguide holes 32 located at both ends. According to this configuration, the opening portions 321 of the three second waveguide holes 32 are brought closer to each other and the arrangement interval between the launchers LC are reduced, so that it is possible to ensure the isolation while restricting the package PG from becoming larger.

The opening portion 321 of the second waveguide hole 32 has the pair of major axis sides 322, 323 extending in the major axis direction DL, the first minor axis side 324 connecting one ends of the pair of major axis sides 322, 323, and the second minor axis side 325 connecting the other ends of the pair of major axis sides 322, 323.

It is preferable that the choke grooves 33 are provided around the opening portions 321 of the second waveguide holes 32 that form the waveguide hole row, so as to extend along the pair of major axis sides 322, 323, and at least one of the first minor axis side 324 and the second minor axis side 325.

In the second waveguide section 30, the opening portions 321 of the second waveguide holes 32 are arranged on the facing surface 301 so that one to three of the peripheral regions AR1 to AR4 are non-opening regions in which the opening portions 321 of the second waveguide holes 32 are not arranged. According to this configuration, an interference between the waveguide paths 34 of the second waveguide holes 32 whose opening portions 321 are adjacent to each other can be avoided. Therefore, it becomes easier to set the multiple waveguide paths 34 in the second waveguide section 30.

Figure 20:
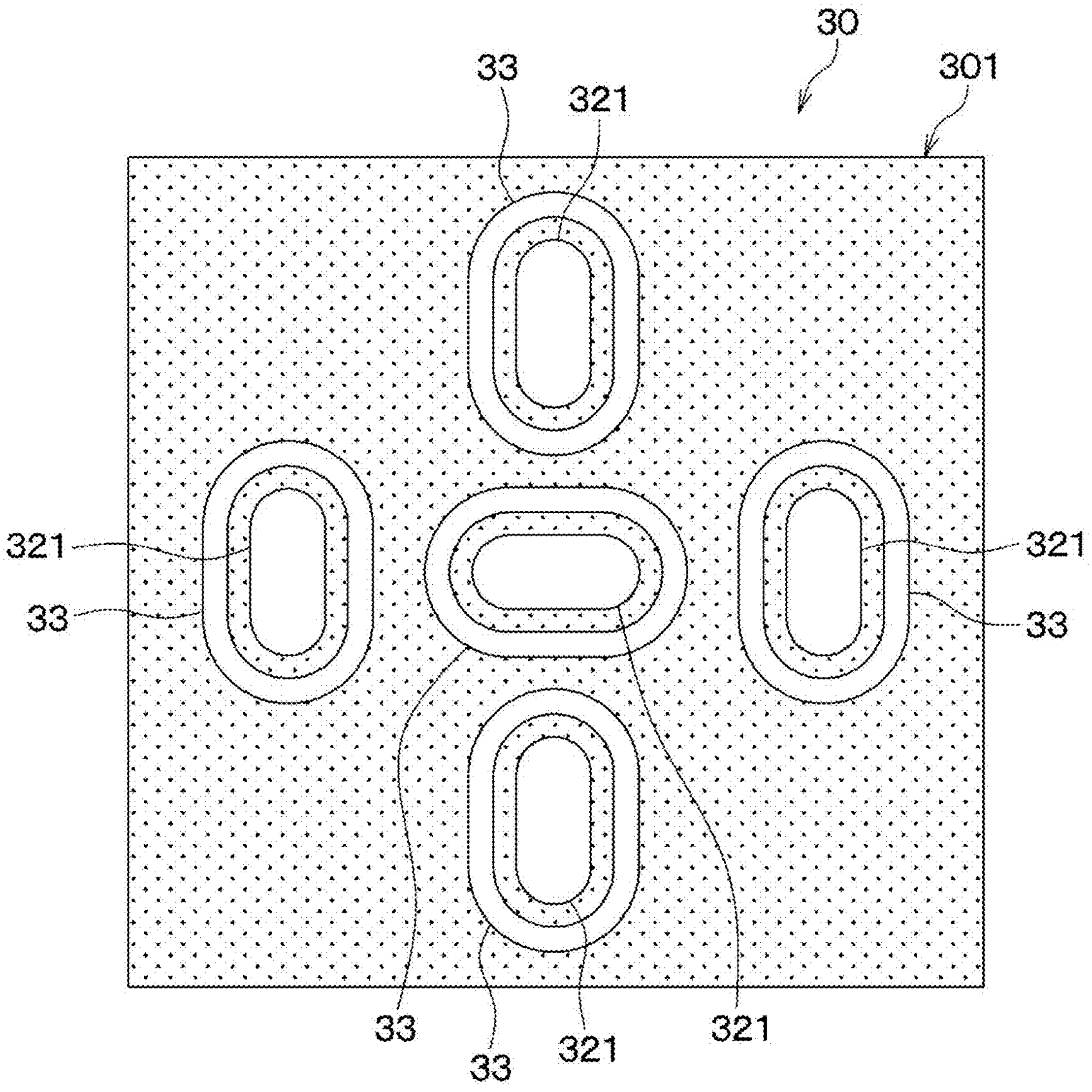
FIG. 20 is a schematic diagram showing an example of a case where the second waveguide holes are arranged such that the opening portion of a part of the second waveguide holes is surrounded on all four sides by the opening portions of the others of the second waveguide holes.
Figure 21:
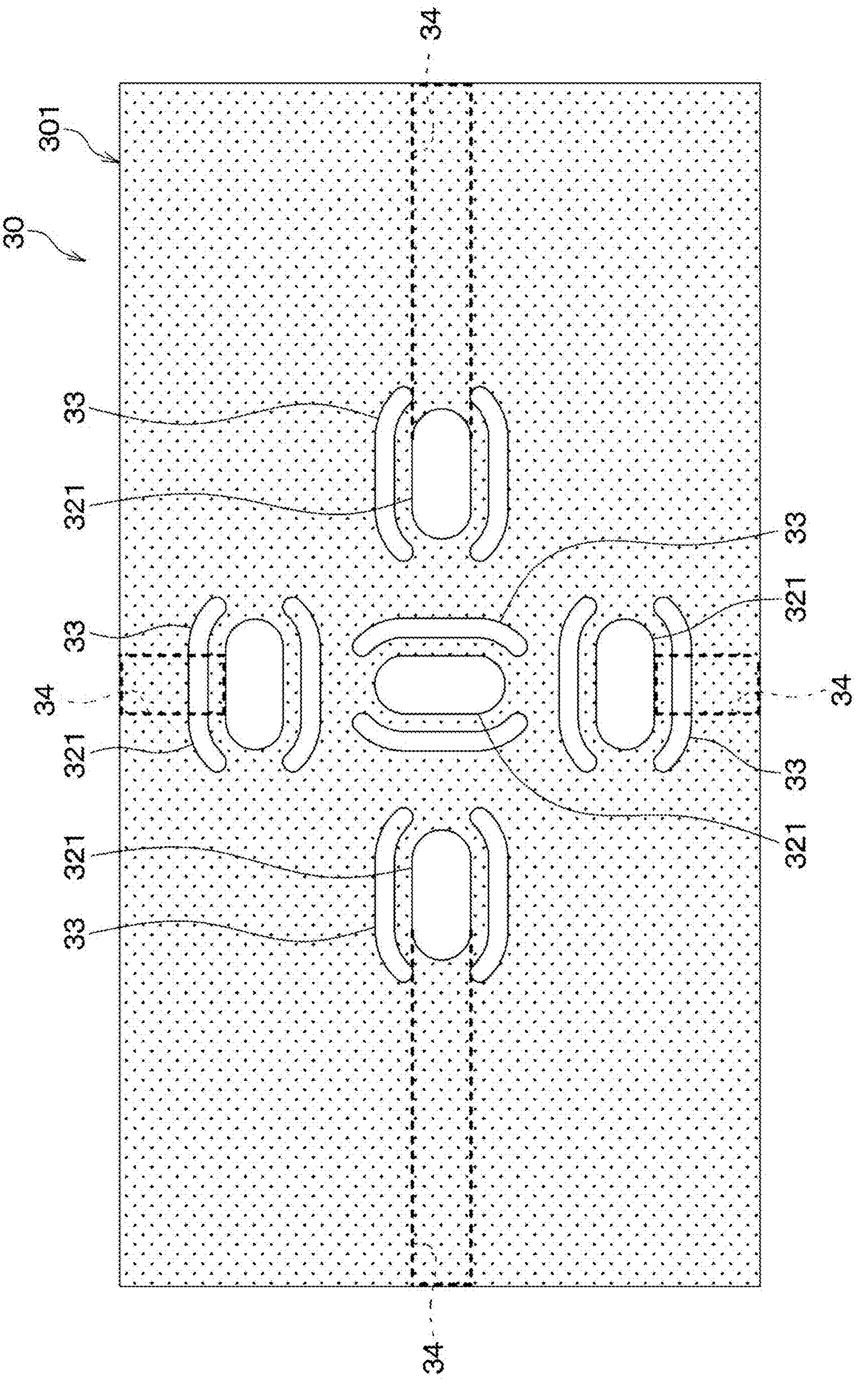
FIG. 21 is a schematic diagram showing another example of a case where the second waveguide holes are arranged such that the opening portion of a part of the second waveguide holes is surrounded on all four sides by the opening portions of the others of the second waveguide holes.
Figure 22:
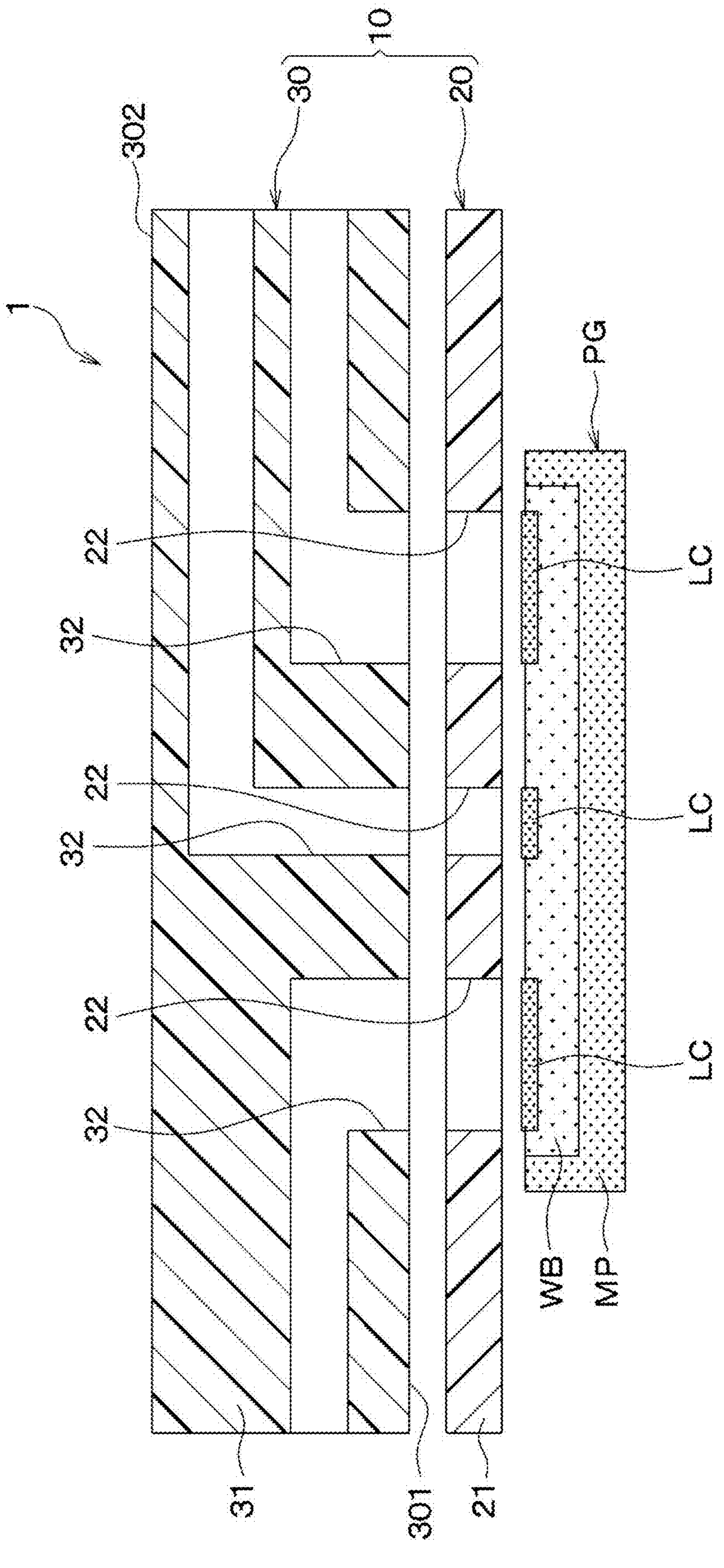
FIG. 22 is an explanatory diagram for explaining an internal structure of the second waveguide section in a case where the second waveguide holes are arranged such that the opening portion of a part of the second waveguide holes is surrounded on all four sides by the opening portions of the others of the second waveguide holes.

For example, as shown in FIG. 20 and FIG. 21, when some of the opening portions 321 of the second waveguide holes 32 are surrounded on all four sides by other opening portions 321, the waveguide path 34 connected to some of the opening portions 321 will interfere with the waveguide path 34 connected to the other opening portions 321. In this case, for example, as shown in FIG. 22, it becomes necessary to take measures such as providing a three-dimensional intersection between the waveguide paths 34 inside the second waveguide section 30, which significantly increases the manufacturing cost.

Figure 23:
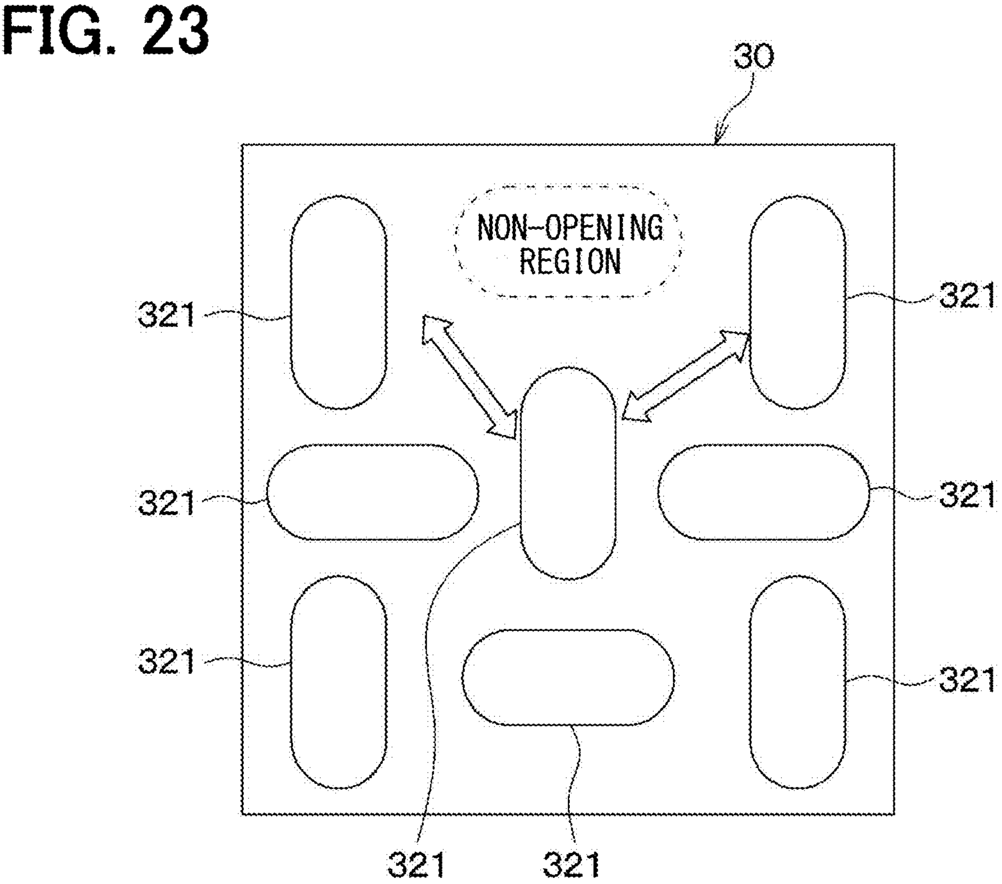
FIG. 23 is a schematic diagram showing an example of a case where the second waveguide holes are arranged such that one side of a periphery of the opening portion of a part of the second waveguide holes is a non-opening region.

Therefore, for example, as shown in FIG. 23, it is preferable that the opening portions 321 of the second waveguide holes 32 are arranged on the facing surface 301 so that at least one of the four sides of the opening portion 321 of each of the second waveguide holes 32 is the non-opening region.

In addition, since an overall size of the antenna is proportional to a beam width and gain, in the radar device 1 of the millimeter wave that requires long-distance detection, the waveguide 10 that constitutes part of the antenna is large relative to the package PG. In the radar device 1, although there is no space available in the package PG, there is space available in the waveguide 10, so that it is possible to set complex waveguide paths 34.

The first waveguide section 20 is disposed on the package PG, and electromagnetic waves transmitted and received by the launchers LC propagate through the first waveguide holes 22 and the second waveguide holes 32. In this way, in a configuration in which electromagnetic waves are propagated from and to the launchers LC by the waveguide 10 without passing through a wiring pattern, the loss during the propagation of the electromagnetic waves can be reduced. This contributes greatly to improving the performance of the radar device 1.

Modified Examples

Modified Examples of the above-described embodiment will be described. In the following modified examples, identical or equivalent parts to those described in preceding embodiment are denoted by identical reference signs, and the description thereof may be omitted. When only some of the constituent elements are described in the modified examples, the other of the constituent elements can be applied with constituent elements described in preceding embodiment. The following modified examples may be partially combined with each other, as long as the combination does not cause any particular problems, even if not specifically stated.

First Modified Example

Figure 24:
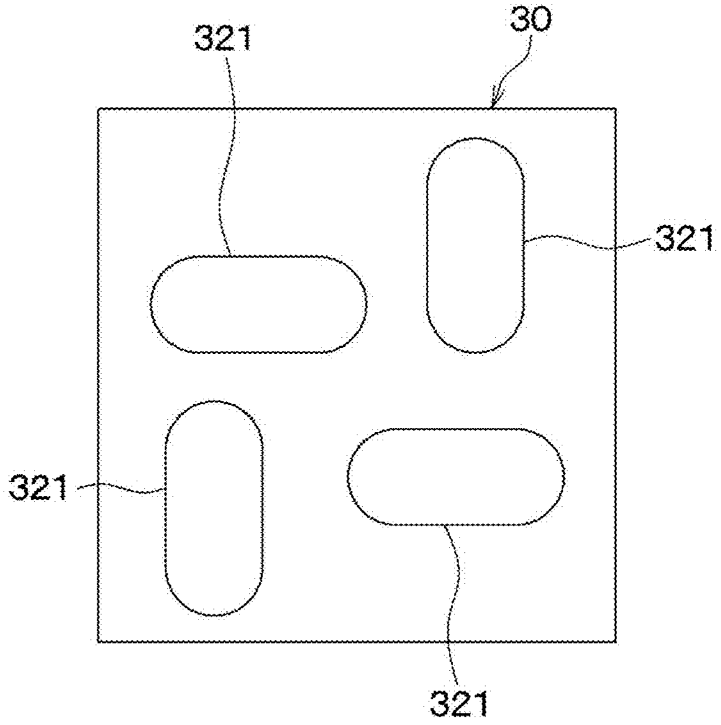
FIG. 24 is a schematic plan view showing a part of a facing surface of a second waveguide section in a waveguide according to a first modified example.

The second waveguide section 30 may have four second waveguide holes 32 formed therein, as shown in FIG. 24, for example. The opening portions 321 of the four second waveguide holes 32 are provided so as to fall within the placement area of the package PG. In this example, the four second waveguide holes 32 are arranged such that the major axis directions DL of the adjacent opening portions 321 are substantially perpendicular to each other. Specifically, the four second waveguide holes 32 are arranged such that the opening portion 321 of each of the four second waveguide holes 32 faces the opening portion 321 of other second waveguide holes 32 in both the minor axis direction DS and the major axis direction DL.

Second Modified Example

Figure 25:
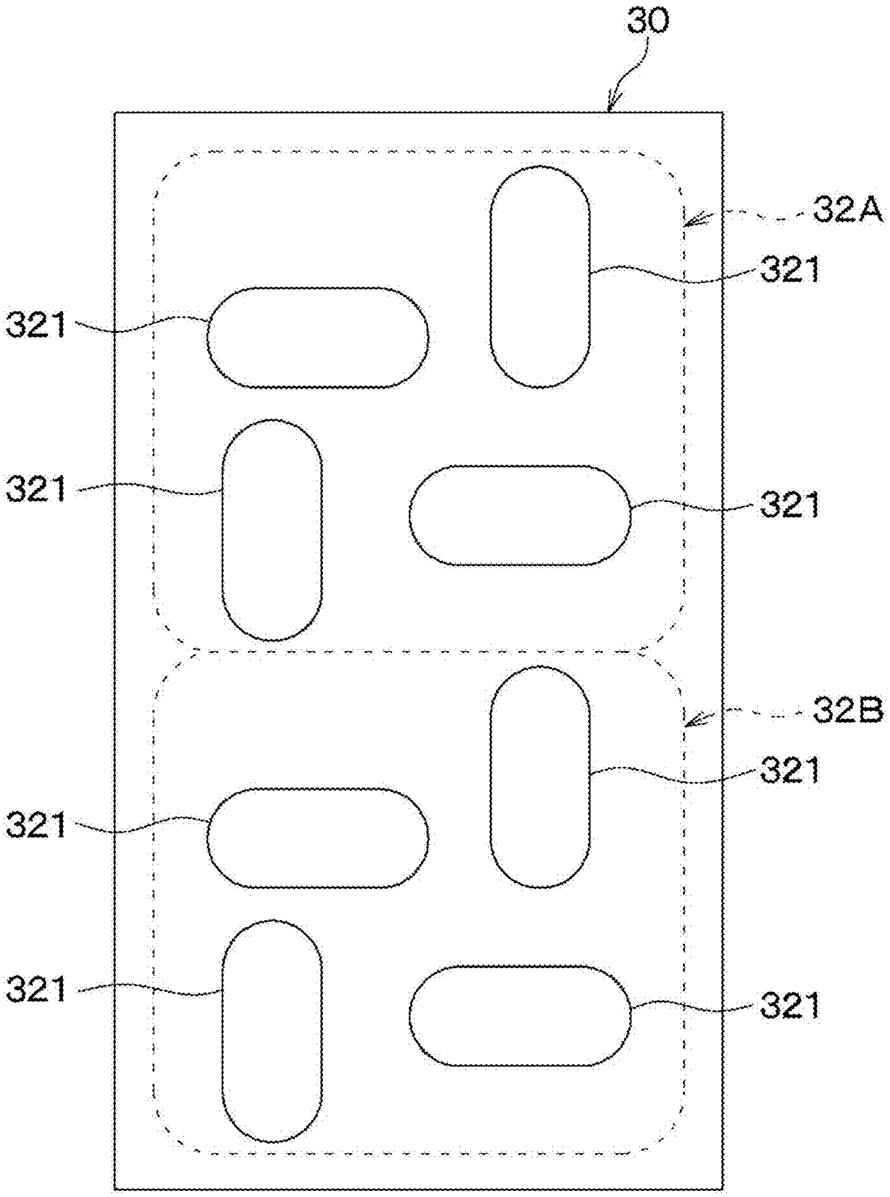
FIG. 25 is an explanatory diagram for explaining a positional relationship between second waveguide holes for transmitting electromagnetic waves and second waveguide holes for receiving electromagnetic waves in a waveguide according to a second modified example.

The second waveguide section 30 may include, for example, a waveguide hole group 32A consisting of the second waveguide holes 32 for transmitting electromagnetic waves, and a waveguide hole group 32B consisting of the second waveguide holes 32 for receiving electromagnetic waves, as shown in FIG. 25. In this case, the opening portions 321 of the second waveguide holes 32 constituting the waveguide hole group 32A and the opening portions 321 of the second waveguide holes 32 constituting the waveguide hole group 32B*a* are arranged so that the major axis directions DL of adjacent opening portions 321 intersect with each other, so that it is possible to arrange the waveguide hole groups 32A, 32B in close proximity to each other.

Third Modified Example

Figure 26:
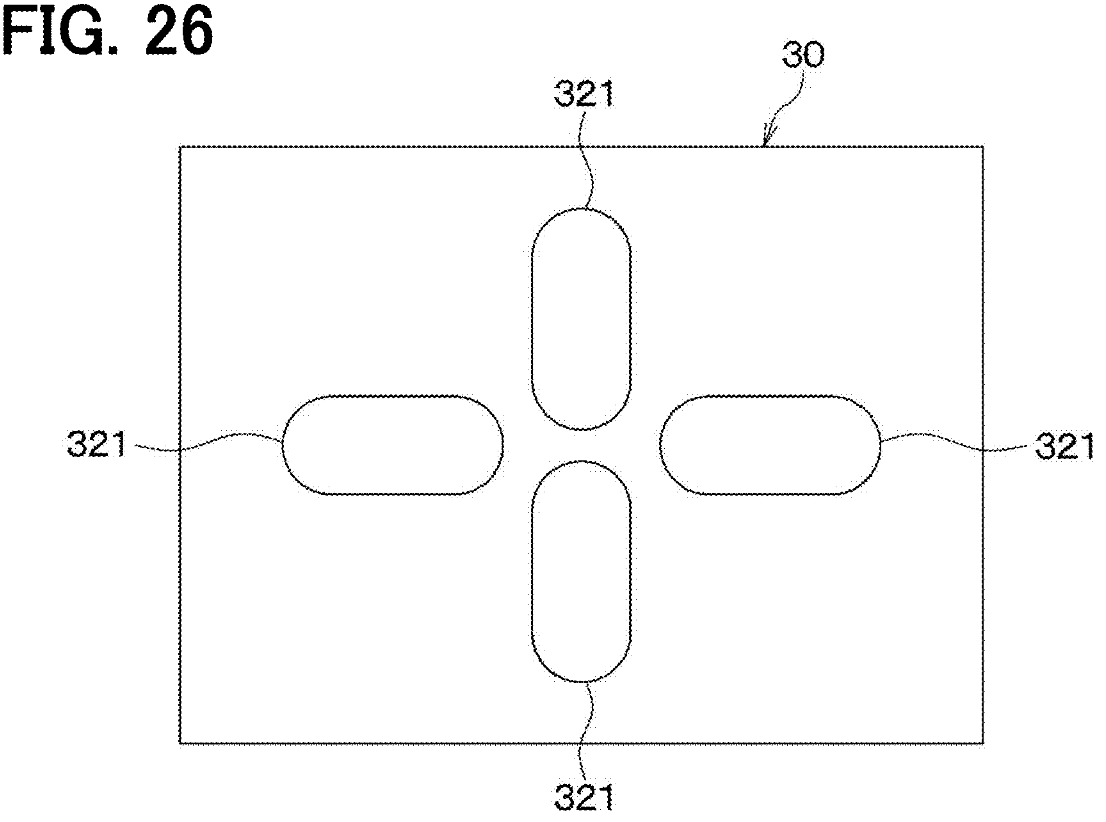
FIG. 26 is a schematic plan view showing a part of an opposing surface of a second waveguide section in a waveguide according to a third modified example.

In the second waveguide section 30, for example, as shown in FIG. 26, the opening portions 321 of the four second waveguide holes 32 may be arranged to form a substantial "+" shape. Specifically, the four second waveguide holes 32 may be arranged such that one of the minor axis sides 324, 325 is adjacent to each other.

Fourth Modified Example

Figure 27:
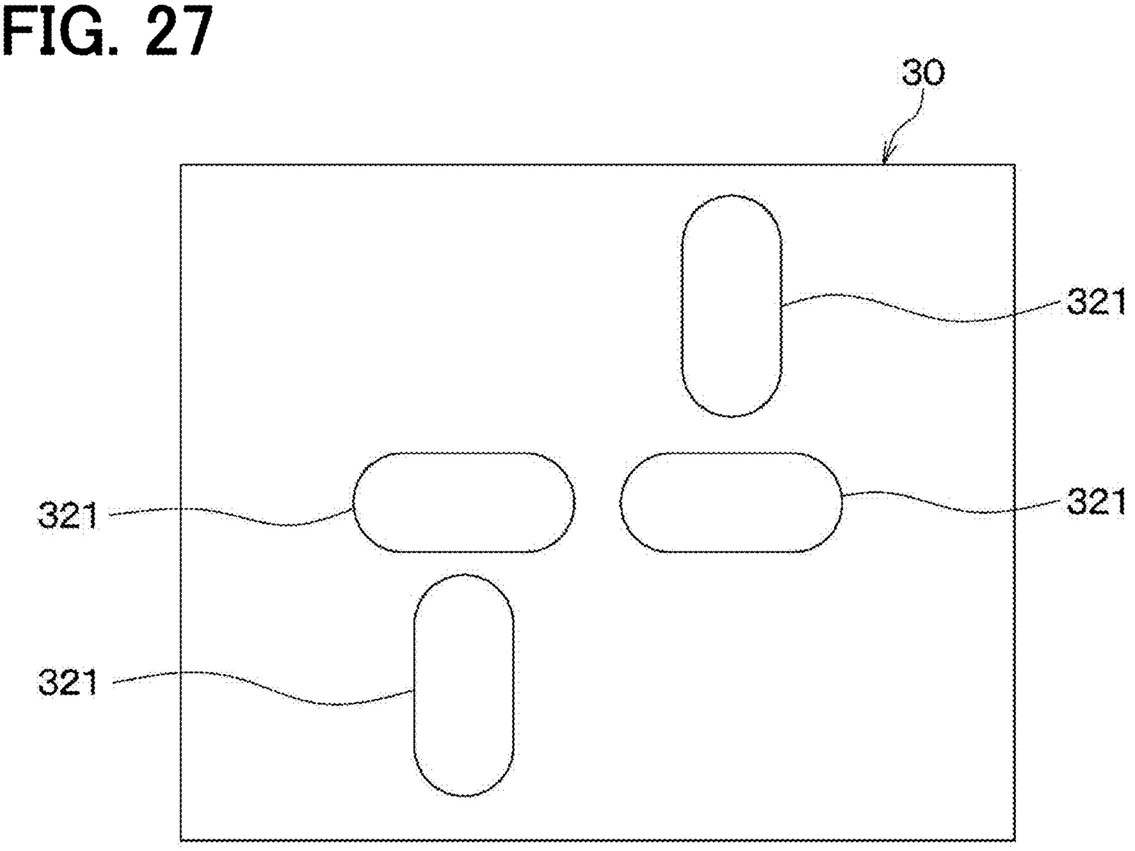
FIG. 27 is a schematic plan view showing a part of an opposing surface of a second waveguide section in a waveguide according to a fourth modified example.

Note that, for example, as shown in FIG. 27, some of the second waveguide holes 32 may be arranged such that major axis directions DL of adjacent opening portions 321 are parallel to each other.

Fifth Modified Example

Figure 28:
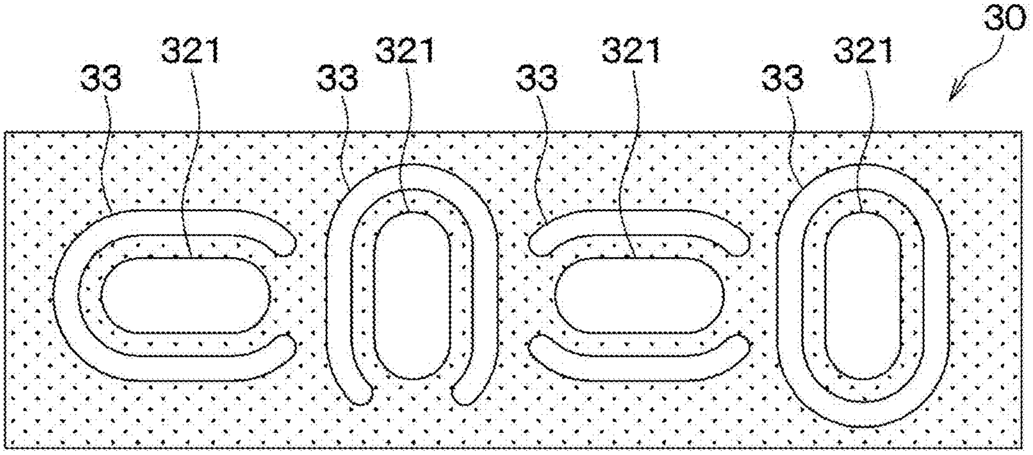
FIG. 28 is a schematic plan view showing a part of an opposing surface of a second waveguide section in a waveguide according to a fifth modified example.

The second waveguide section 30 may include a waveguide hole row in which four or more second waveguide holes 32 are arranged in a predetermined direction, as shown in FIG. 28, for example. In the example shown in FIG. 28, the major axis directions DL of adjacent second waveguide holes 32 are arranged so as to intersect with each other, so that the opening portions 321 of the second waveguide hole 32 can be brought closer to each other, thereby making it possible to reduce the arrangement interval between the launchers LC. As a result, it is possible to ensure the isolation while restricting the package PG from becoming larger.

In the example shown in FIG. 28, the choke grooves 33 are formed as the O-shaped groove, the U-shaped grooves, and the C-shaped groove so that one choke groove 33 is provided between the adjacent opening portions 321 of the second waveguide holes 32. According to this configuration, the opening portions 321 of the second waveguide holes 32 can be brought closer to each other.

Sixth Modified Example

Figure 29:
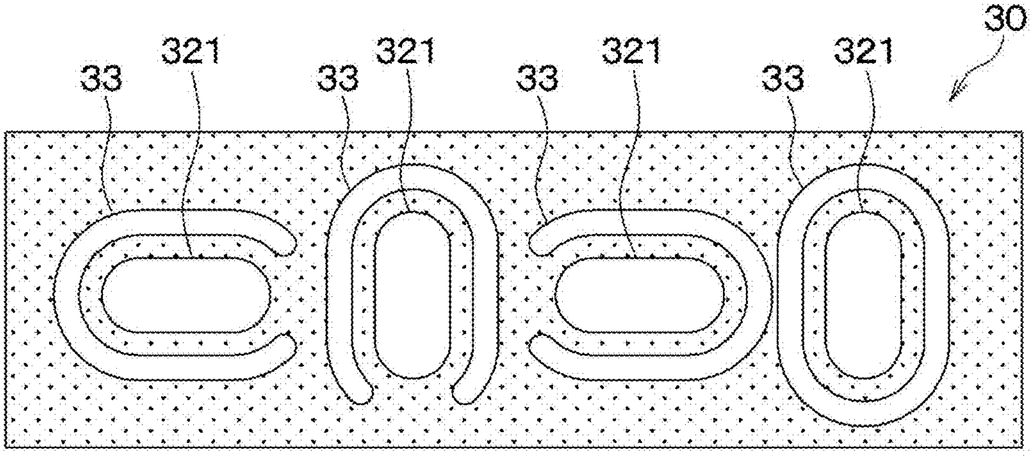
FIG. 29 is a schematic plan view showing a part of an opposing surface of a second waveguide section in a waveguide according to a sixth modified example.

In the second waveguide section 30, for example, as shown in FIG. 29, the choke grooves 33 in the form of O-shaped groove or U-shaped groove may be formed around the opening portions 321 of the second waveguide hole 32. According to this configuration, the isolation can be improved compared to the case where the choke groove 33 in the form of C-shaped groove is provided around the second waveguide hole 32.

Seventh Modified Example

Figure 30:
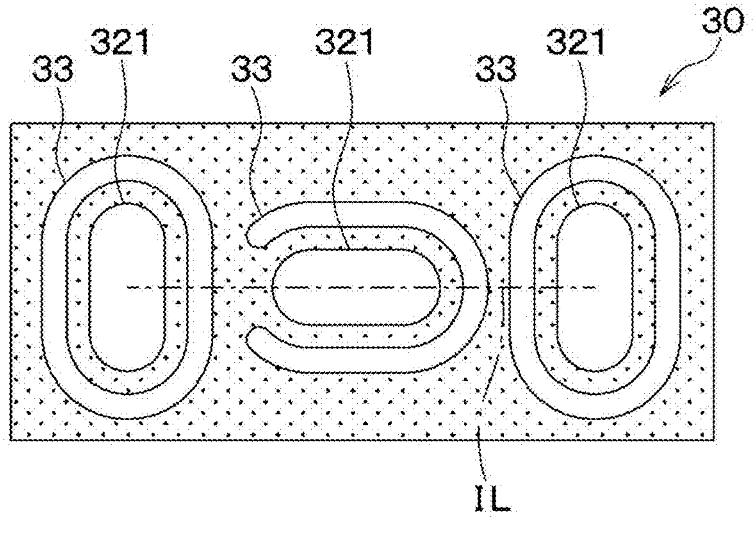
FIG. 30 is a schematic plan view showing an example of an opposing surface of a second waveguide section in a waveguide according to a seventh modified example.

When the opening portions 321 of the three second waveguide holes 32 are arranged side by side, it is preferable that the opening portion 321 of the second waveguide hole 32 at a middle position be arranged so as to overlap with an imaginary line IL connecting the centers of the opening portions 321 of the second waveguide holes 32 at both ends, as shown in FIG. 30.

Figure 31:
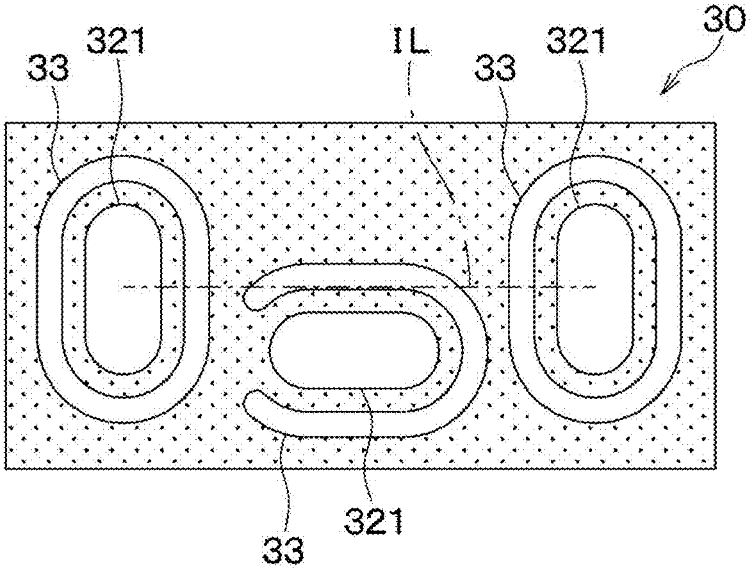
FIG. 31 is a schematic plan view showing another example of the opposing surfaces of the second waveguide section in the waveguide according to the seventh modified example.

However, the second waveguide holes 32 may be arranged, for example, as shown in FIG. 31, such that the opening portions 321 of the second waveguide holes 32 at both ends and the opening portion 321 of the second waveguide hole 32 at the middle position overlap in the major axis direction DL of the opening portion 321 of the second waveguide hole 32 at the middle position.

Figure 32:
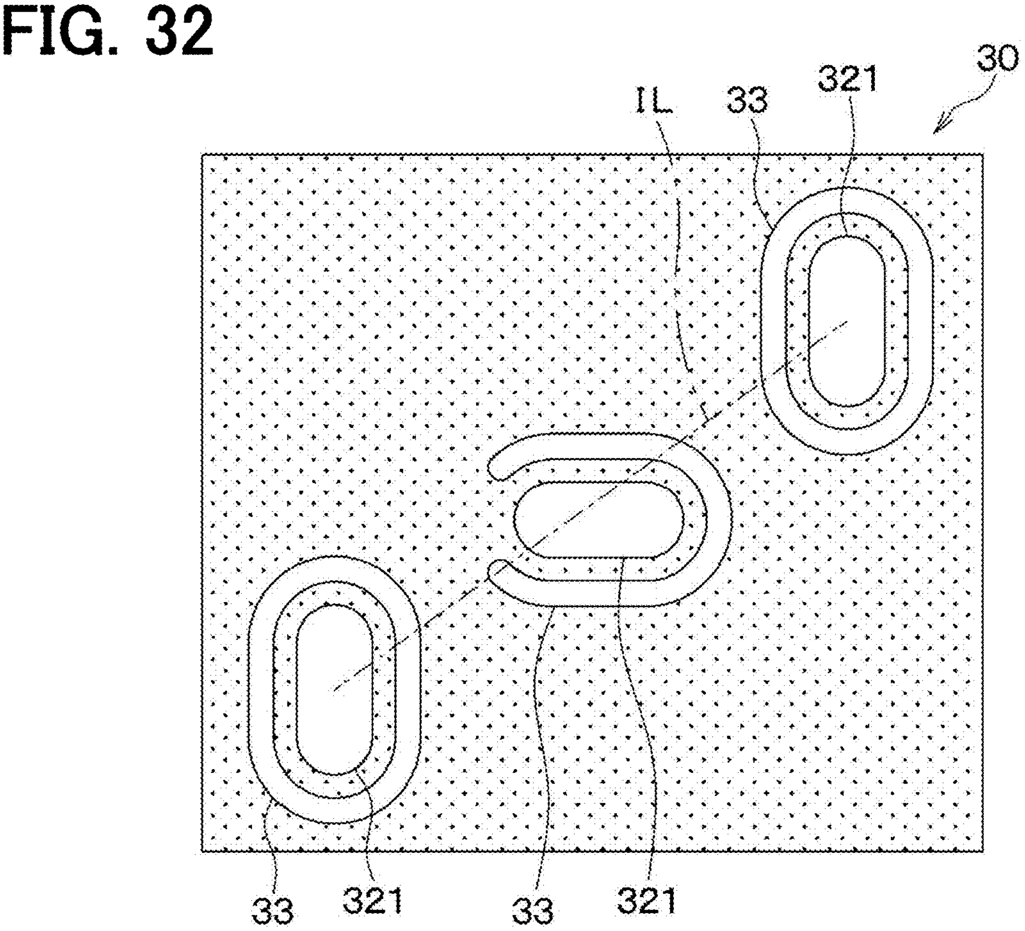
FIG. 32 is a schematic plan view showing another example of the opposing surfaces of the second waveguide section in the waveguide according to the seventh modified example.

Furthermore, the second waveguide holes 32 may be arranged, for example, as shown in FIG. 32, such that the opening portions 321 of the second waveguide holes 32 at both ends and the opening portion 321 of the second waveguide hole 32 at the middle position do not overlap in the major axis direction DL of the opening portion 321 of the second waveguide hole 32 at the middle position. In this case, it is preferable that the opening portion 321 of the second waveguide hole 32 at the middle position overlaps with an imaginary line IL connecting the centers of the opening portions 321 of the second waveguide holes 32 at both ends.

Eighth Modified Example

In the above-described embodiment, the first waveguide section 20 of the waveguide 10 is disposed on the package PG, but the present disclosure is not limited to this example.

Figure 33:
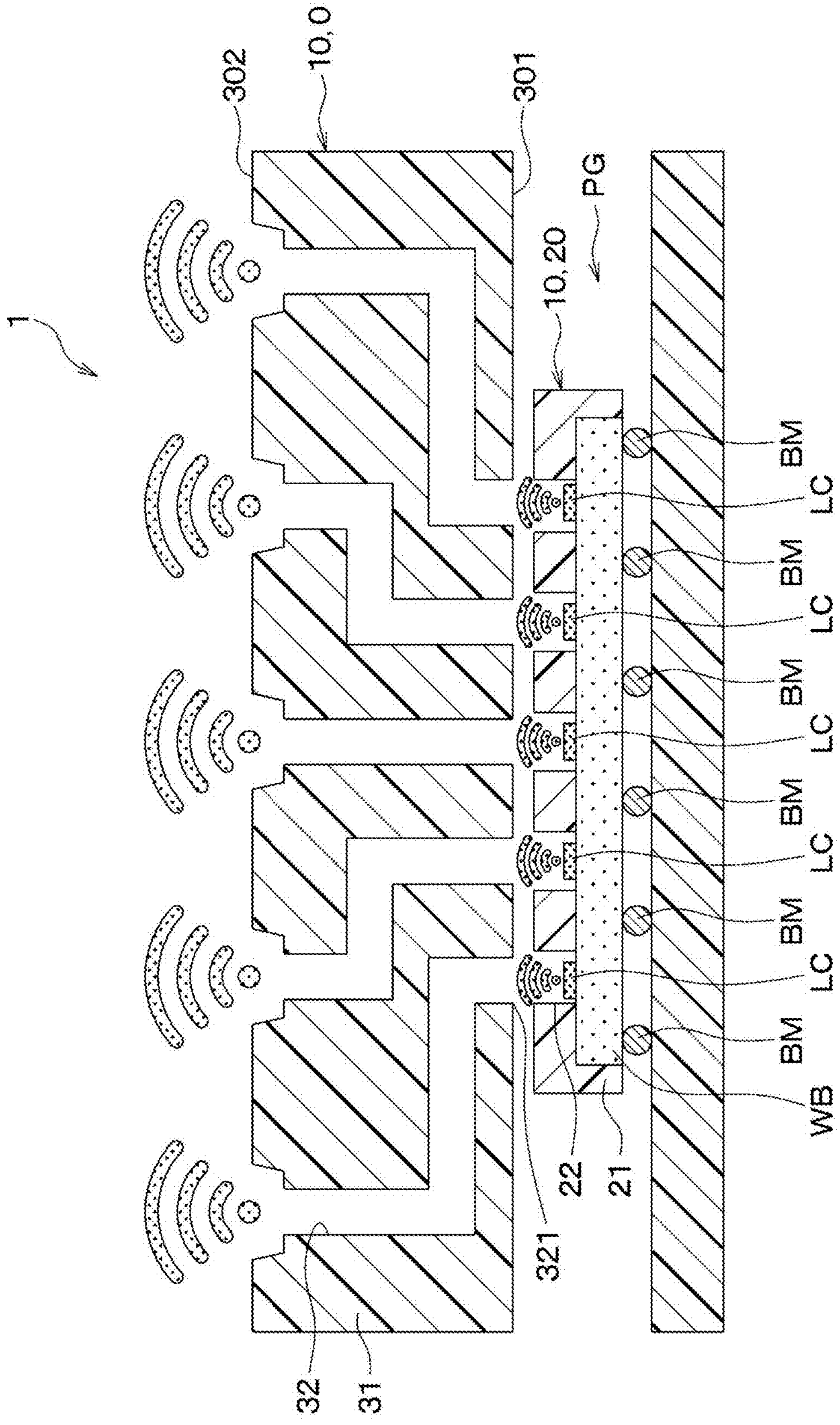
FIG. 33 is a schematic diagram of a radar device including a waveguide according to an eighth modified example.

The waveguide 10 may be configured, for example, as shown in FIG. 33, such that the first waveguide section 20 is formed as part of a package PG, and electromagnetic waves transmitted and received by the launchers LC propagate through the first waveguide holes 22 and the second waveguide holes 32. Even when configured in this manner, the electromagnetic waves are propagated from and to the launchers LC by the waveguide 10 without passing through a wiring pattern, thereby reducing the loss during the propagation of the electromagnetic waves. This contributes greatly to improving the performance of the radar device 1.

Other Embodiments

Although the representative embodiments of the present disclosure have been described above, the present disclosure is not limited to the embodiments and can be variously modified as follows, for example.

In the above embodiment, the opening portion 321 of each of the second waveguide holes 32 has an elliptical shape. However, the opening shape of the opening portion 321 may be a shape other than the elliptical shape as long as it is the elongated hole shape.

As in the above-described embodiment, it is preferable that the opening shape of the first waveguide holes 22 be similar to the opening portions 321 of the second waveguide holes 32, but the present disclosure is not limited thereto. The opening shape of the first waveguide holes 22 may be different from the opening shape of the opening portions 321 of the second waveguide holes 32.

In the above-described embodiment, the second waveguide section 30 is exemplified by a resin molded product having a surface coated with the metal film. However, the second waveguide section 30 is not limited to this example and may be made of, for example, a metal molding product.

In the above-described embodiment, the operating frequency of the radio waves transmitted and received by the radar device 1 is a frequency corresponding to millimeter waves, but the present disclosure is not limited thereto. The operating frequency of the radio waves transmitted and received by the radar device 1 may be a frequency other than millimeter waves.

As in the above-described embodiment, it is preferable that the choke grooves 33 are formed on the facing surface 301 of the second waveguide section 30. However, the choke grooves 33 are not essential to the waveguide 10 and may be omitted.

In the above-described embodiment, an example has been described in which the waveguide 10 is applied to the radar device 1 for detecting an object around a vehicle, but the waveguide 10 can be applied to various devices other than radar devices for vehicles.

In the above-described embodiments, it is needless to say that the elements constituting the embodiments are not necessarily essential unless otherwise specified as being essential in particular or and obviously essential in principle.

In the above-described embodiments, when a numerical value such as the number, a numerical value, an amount, or a range of the constituent elements of the embodiments is mentioned, the numerical value is not limited to the specific number unless otherwise specified as being essential in particular and obviously limited to the specific number in principle.

In the above-described embodiments, when the shapes, positional relationships, and the like of the constituent elements and the like are mentioned, the shapes, positional relationships, and the like are not limited to those mentioned unless otherwise specified and limited to specific shapes, positional relationships, and the like in principle.

What is claimed is:

1. A waveguide to be applied to a package that includes launchers for transmitting and receiving electromagnetic waves, comprising:

a first waveguide section having first waveguide holes that are configured to propagate the electromagnetic waves transmitted and received by the launchers; and a second waveguide section having second waveguide holes that open to face the first waveguide holes, respectively, a number of the second waveguide holes being equal to a number of the first waveguide holes, wherein the second waveguide section is disposed with a predetermined gap between the second waveguide section and the first waveguide section, each of the second waveguide holes has an opening portion of an elongated hole shape that opens on a facing surface of the second waveguide section that faces the first waveguide section, a direction along a major axis of the opening portion of each of the second waveguide holes is defined as a major axis direction of the opening portion of each of the second waveguide holes, the major axis direction of the opening portion of one of the second waveguide holes intersects with the major axis direction of the opening portion of another of the second waveguide holes that is adjacent to the one of the second waveguide holes, among the second waveguide holes, adjacent second waveguide holes whose opening portions are adjacent to each other with an interval of a predetermined value or less are arranged such that the major axis directions of the opening portions of the adjacent second waveguide holes intersect with each other, the second waveguide section has a choke groove between the opening portions of the adjacent second waveguide holes that are adjacent to each other with the interval of the predetermined value or less, the opening portion of each of the second waveguide hole has a pair of major axis sides extending in the major axis direction, a first minor axis side connecting ends of the pair of major axis sides, and a second minor axis side connecting other ends of the pair of major axis sides, among the second waveguide holes, four or more second waveguide holes are arranged in a predetermined direction to form a waveguide hole row, in the waveguide hole row, the four or more second waveguide holes are arranged such that the major axis directions of the adjacent second waveguide holes that are adjacent to each other in the predetermined direction intersect with each other, and the choke groove is disposed around the opening portion of each of the second waveguide holes that form the waveguide hole row so as to extend along the pair of major axis sides and at least one of the first minor axis side and the second minor axis side.

2. The waveguide according to claim 1, wherein among regions of the facing surface surrounding the opening portion of each of the second waveguide holes, a region connected to one of the pair of major axis sides in a minor axis direction of the opening portion is defined as a first peripheral region, a region connected to another of the pair of major axis sides in the minor axis direction is defined as a second peripheral region, a region connected to the first minor axis side in the major axis direction is defined as a third peripheral region, and a region connected to the second minor axis side in the major axis direction is defined as a fourth peripheral region, and the opening portion of each of the second waveguide holes is arranged on the facing surface so that one to three of the first peripheral region, the second peripheral region, the third peripheral region, and the fourth peripheral region are non-opening regions where the opening portions of the second waveguide holes are not arranged.

3. The waveguide according to claim 1, wherein the first waveguide section is disposed on the package, and the electromagnetic waves transmitted and received by the launchers propagate through the first waveguide holes and the second waveguide holes.

4. The waveguide according to claim 1, wherein the first waveguide section constitutes a part of the package, and the electromagnetic waves transmitted and received by the launchers propagate through the first waveguide holes and the second waveguide holes.

* * * * *